(12) United States Patent
Sheppard et al.

(10) Patent No.: US 10,820,026 B2
(45) Date of Patent: *Oct. 27, 2020

(54) METHODS AND APPARATUS TO IDENTIFY CO-RELATIONSHIPS BETWEEN MEDIA USING SOCIAL MEDIA

(71) Applicant: The Nielsen Company (US), LLC, New York, NY (US)

(72) Inventors: Michael Sheppard, Brooklyn, NY (US); Matthew B. Reid, Alameda, CA (US); Alejandro Terrazas, Santa Cruz, CA (US); Jonathan Sullivan, Natick, MA (US); Peter Lipa, Tucson, AZ (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/228,254

(22) Filed: Dec. 20, 2018

(65) Prior Publication Data
US 2019/0124381 A1    Apr. 25, 2019

Related U.S. Application Data

(63) Continuation of application No. 14/880,594, filed on Oct. 12, 2015, now Pat. No. 10,187,675.

(51) Int. Cl.
*H04N 21/25* (2011.01)
*H04L 29/06* (2006.01)
(Continued)

(52) U.S. Cl.
CPC ..... *H04N 21/251* (2013.01); *G06F 16/24578* (2019.01); *G06F 16/285* (2019.01);
(Continued)

(58) Field of Classification Search
CPC .............................. G06Q 10/00; G06Q 40/00
(Continued)

(56) References Cited

U.S. PATENT DOCUMENTS

| 8,285,851 | B2 * | 10/2012 | Robbin | ................... H04L 65/60 |
| | | | | 707/610 |
| 8,347,213 | B2 * | 1/2013 | Clifton | ................... G06F 16/40 |
| | | | | 715/730 |

(Continued)

FOREIGN PATENT DOCUMENTS

WO    WO-2014188354 A1 *  11/2014    .......... H04N 21/812

OTHER PUBLICATIONS

Stelter, "Nielsen to Measure Twitter Chatter About TV Shows," The New York Times, Oct. 6, 2013, 3 pages.
(Continued)

*Primary Examiner* — Romain Jeanty
(74) *Attorney, Agent, or Firm* — Hanley, Flight & Zimmerman, LLC

(57) ABSTRACT

Methods, apparatus, systems and articles of manufacture are disclosed to identify co-relationships between media using social media. An example apparatus includes an audience estimator to: estimate a first audience of first media based on a first set of media-exposure social media messages corresponding to client devices referencing the first media, and estimate a second audience of second media based on a second set of media-exposure social media messages corresponding to the client devices referencing the second media. The example apparatus also includes a pairing classifier to: determine a pairing-score for a media-pairing based on the first and second audiences and the first and second sets of media-exposure social media messages, determine a relationship threshold to apply to the media-pairing based on the first media and the second media, and classify the media- (Continued)

pairing based on the pairing-score and the relationship threshold to improve an accuracy of a system associated with generating audience analysis information.

20 Claims, 15 Drawing Sheets

(51) Int. Cl.
  *H04N 21/442*    (2011.01)
  *H04N 21/45*     (2011.01)
  *H04N 21/4788*    (2011.01)
  *G06F 16/28*     (2019.01)
  *G06F 16/2457*    (2019.01)
  *H04L 29/08*     (2006.01)
  *H04L 12/26*     (2006.01)

(52) U.S. Cl.
  CPC ............ *H04L 43/062* (2013.01); *H04L 43/16* (2013.01); *H04L 65/4076* (2013.01); *H04L 67/30* (2013.01); *H04N 21/44213* (2013.01); *H04N 21/4532* (2013.01); *H04N 21/4788* (2013.01)

(58) Field of Classification Search
  USPC ................................................ 705/7.12–7.29
  See application file for complete search history.

(56) References Cited

U.S. PATENT DOCUMENTS

| | | | |
|---|---|---|---|
| 8,462,160 B2 | 6/2013 | Lindsay et al. | |
| 8,538,957 B1* | 9/2013 | Zhou | G06F 17/2854 |
| | | | 707/728 |
| 8,555,327 B2 | 10/2013 | Oztaskent et al. | |
| 8,935,713 B1 | 1/2015 | Gabel et al. | |
| 8,989,562 B2 | 3/2015 | Kummer et al. | |
| 9,009,758 B2 | 4/2015 | Foote et al. | |
| 9,430,585 B2* | 8/2016 | Garg | G06F 16/90324 |
| 9,892,369 B2* | 2/2018 | Abboa-Offei | G06Q 10/00 |
| 2009/0248665 A1* | 10/2009 | Garg | G06F 16/90324 |
| 2010/0082397 A1* | 4/2010 | Blegen | G06Q 30/0261 |
| | | | 705/14.58 |
| 2010/0162312 A1 | 6/2010 | Heilbron et al. | |
| 2012/0246054 A1* | 9/2012 | Sastri | G06Q 10/04 |
| | | | 705/37 |
| 2012/0291070 A1 | 11/2012 | Feng et al. | |
| 2013/0073336 A1 | 3/2013 | Heath | |
| 2013/0103637 A1 | 4/2013 | Dror et al. | |
| 2013/0231974 A1 | 9/2013 | Harris et al. | |
| 2014/0040967 A1 | 2/2014 | Oztaskent et al. | |
| 2014/0046884 A1 | 2/2014 | Erdmann et al. | |
| 2014/0222549 A1 | 8/2014 | Bruich et al. | |
| 2014/0351045 A1* | 11/2014 | Abihssira | G06Q 30/0255 |
| | | | 705/14.53 |
| 2015/0067075 A1 | 3/2015 | Sheppard et al. | |
| 2015/0149373 A1 | 5/2015 | Chhaya et al. | |
| 2015/0379586 A1 | 12/2015 | Mooney et al. | |
| 2016/0034922 A1 | 2/2016 | Chhaya et al. | |
| 2016/0189181 A1 | 6/2016 | McClave et al. | |
| 2016/0196561 A1 | 7/2016 | Iyer et al. | |

OTHER PUBLICATIONS

Creegan, "Can Twitter data explain Sharknado TV appeal?," CNBC, Aug. 15, 2013, 6 pages.

United States Patent and Trademark Office, "Non-Final Office Action," issued in connection with U.S. Appl. No. 14/880,594, dated Mar. 8, 2018, 12 pages.

United States Patent and Trademark Office, "Notice of Allowance and Fee(s) Due," issued in connection with U.S. Appl. No. 14/880,594, dated Sep. 12, 2018, 10 pages.

* cited by examiner

| Message ID | Message Posting Timestamp | Message | Message Author |
|---|---|---|---|
| 0001 | 08/07/2015 10:12 PM | Going to see his movie when it comes out! So funny on #TalkShow | @User-123 |
| 0002 | 08/11/2015 3:23 PM | That's why she is the best #golfer in the world! #Championships | @Golf-Fan |
| 0003 | 08/15/2015 11:11 AM | Why can't they all get along? #FamilyCourt | @User-ABC |
| ... | ... | ... | ... |

SOCIAL MEDIA MESSAGES POSTED BY USERS

FIG. 3

| Media Identifier | Media Time Range | Media Keyword(s) |
|---|---|---|
| 08/07/2015 Talk Show | 9:30 – 10:30 PM (CT) Weekdays | Talk Show; Comedian; Funny |
| 08/11/2015 Golf Tournament | 4:00 – 7:00 PM (CT) August 11, 2015 | Golf; Championships; Golfer |
| 08/15/2015 Family Court | 11:00 – 12:00 AM (CT) Weekdays | Family; Daytime; Court |
| ... | ... | ... |

MEDIA PROFILE INFORMATION

FIG. 4

| Media Identifier 510 | Message Identifier 520 | Message Author 530 | Message Viewer 540 |
|---|---|---|---|
| 08/11/2015 Golf Tournament | 0002 | @Golf-Fan | N/A |
| 08/11/2015 Golf Tournament | 0002 | N/A | @Sports_Star |
| 08/11/2015 Golf Tournament | 0002 | N/A | @User-ABC |
| ... | ... | ... | ... |

560 ↗ 570 ↗ 580 ↗

QUERY RESPONSES

| Media Identifier | Number of Messages | Number of Unique Audience Members |
|---|---|---|
| 08/07/2015 Talk Show | 13,597 | 9,541 |
| 08/11/2015 Golf Tournament | 105,997 | 68,753 |
| 08/15/2015 Family Court | 590 | 570 |
| ... | ... | ... |

MEDIA AUDIENCE ESTIMATES

FIG. 6

| Media #1 Identifier | Media #2 Identifier | Number of Overlapping Audience Members | Smallest Number of Unique Audience Members | Pairing Score | Threshold Applied | Media Related? |
|---|---|---|---|---|---|---|
| 08/07/2015 Talk Show | 08/11/2015 Golf Tournament | 681 | 9,541 | 7% | 70% | No |
| 08/07/2015 Talk Show | 08/15/2015 Family Court | 152 | 570 | 27% | 80% | No |
| 08/11/2015 Golf Tournament | 08/15/2015 Family Court | 404 | 570 | 71% | 70% | Yes |
| ... | ... | ... | ... | ... | ... | ... |

CLASSIFIED MEDIA-PAIRINGS

FIG. 7

METHODS AND APPARATUS TO IDENTIFY CO-RELATIONSHIPS BETWEEN MEDIA USING SOCIAL MEDIA

RELATED APPLICATION

This patent arises from a continuation of U.S. patent application Ser. No. 14/880,594, which was filed on Oct. 12, 2015. U.S. patent application Ser. No. 14/880,594 is hereby incorporated herein by reference in its entirety. Priority to U.S. patent application Ser. No. 14/880,594 is hereby claimed.

FIELD OF THE DISCLOSURE

This disclosure relates generally to audience measurement, and, more particularly, to methods and apparatus to identify co-relationships between media using social media.

BACKGROUND

Audience measurement of media (e.g., any type of content and/or advertisements such as broadcast television and/or radio, stored audio and/or video played back from a memory such as a digital video recorder or a digital video disc, a webpage, audio and/or video presented (e.g., streamed) via the Internet, a video game, etc.) often involves collection of media identifying information (e.g., signature(s), fingerprint(s), code(s), tuned channel identification information, time of exposure information, etc.). Such audience measurement efforts typically also involve the collection of people data (e.g., user identifier(s), demographic data associated with audience member(s), etc.). The media identifying information and the people data can be combined to generate, for example, media exposure data indicative of amount(s) and/or type(s) of people that were exposed to specific piece(s) of media.

BRIEF DESCRIPTION OF THE DRAWINGS

FIG. 3 is an example data table that may be stored by the example social media server of FIGS. 1 and/or 2 to store social media messages.

FIG. 4 is an example data table that may be stored by the example central facility of FIGS. 1 and/or 2 representing media time ranges and media keywords associated with different media.

FIG. 5 is an example data table representing query responses that may be supplied to the example central facility of FIGS. 1 and/or 2 by the example social media server of FIGS. 1 and/or 2.

FIG. 6 is an example data table that may be stored by the example central facility of FIGS. 1 and/or 2 to store media audience estimates based on media identified in social media messages of interest.

FIG. 7 is an example data table that may be stored by the example central facility of FIGS. 1 and/or 2 representing relationship classifications for media-pairings.

Wherever possible, the same reference numbers will be used throughout the drawing(s) and accompanying written description to refer to the same or like parts.

DETAILED DESCRIPTION

Figure 1:
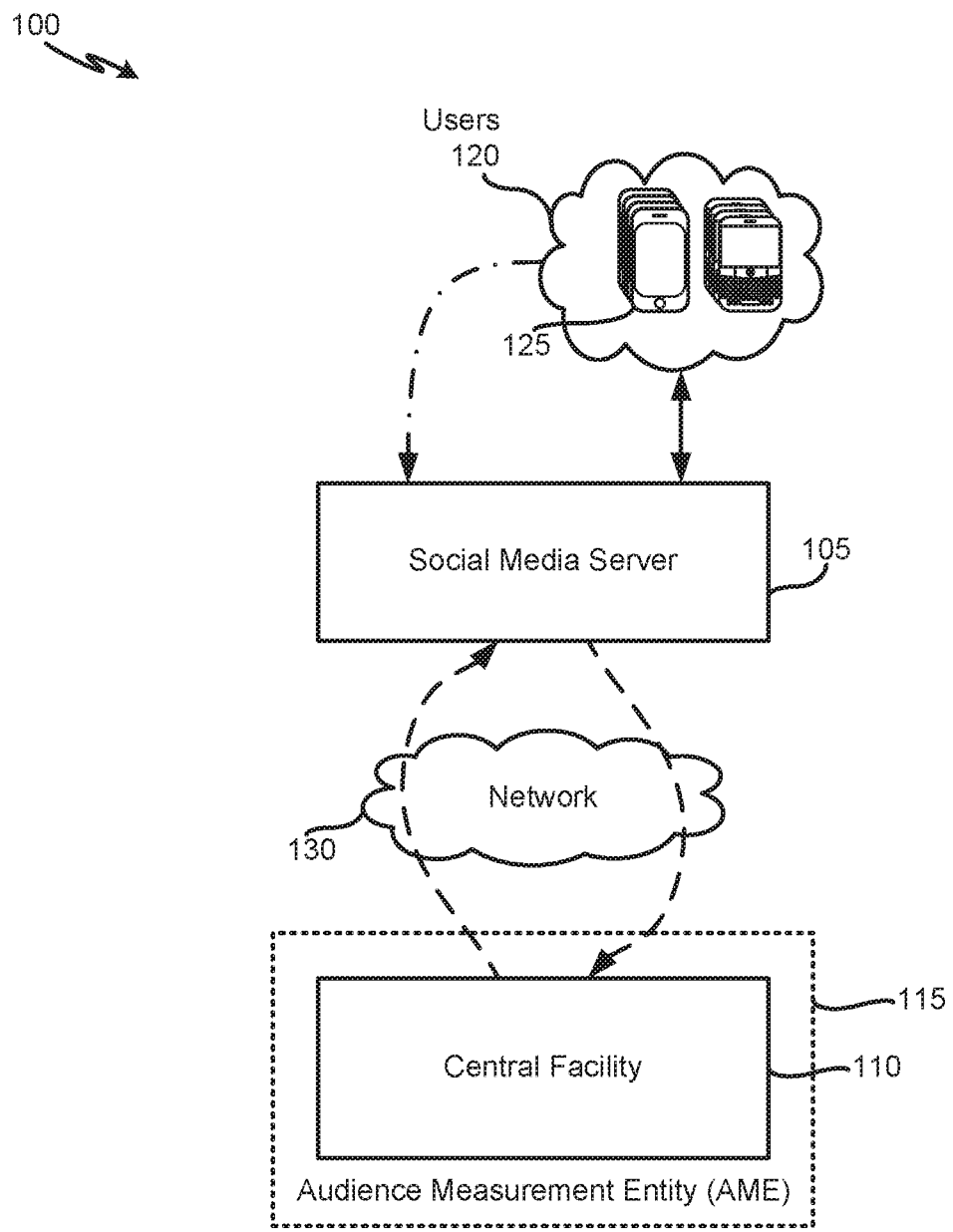
FIG. 1 is a diagram of an example environment in which a system constructed in accordance with the teachings of this disclosure operates to identify co-relationships between media using social media.

Example methods, systems and apparatus disclosed herein may be used to identify media commonly viewed by people having similar interests. In some examples, social media messages posted by users (e.g., message authors) are analyzed to identify media combinations. For example, techniques disclosed herein enable utilizing social media to optimize exposure to sponsored media by discovering and/or classifying relationships between media based on social media messages related to the media.

Monitoring impressions of media (e.g., television (TV) programs, radio programs, advertisements, commentary, audio, video, movies, commercials, websites, etc.) is useful for generating ratings or other statistics for presented media. As used herein, an impression is defined to be an event in which a home or individual is exposed to media (e.g., an advertisement, content, a group of advertisements and/or a collection of content). A quantity of impressions or impression count, with respect to media, is the total number of times homes or individuals have been exposed to the media. For example, in audience metering systems, media identifying information may be detected at one or more monitoring sites when the media is presented (e.g., played at monitored environments such as households). In such examples, the collected media identifying information may be sent to a central data collection facility associated with an audience measurement entity (AME), such as The Nielsen Company (US), LLC with people meter data identifying person(s) in the audience for analysis such as the computation of an impression count for the media. That is, the audience measurement entity does not provide media (e.g., content and/or advertisements) to end users. This un-involvement with the media production and/or delivery ensures the neutral status of the audience measurement entity and, thus, enhances the trusted nature of the data the AME collects and processes. The reports generated by the audience measurement entity may identify aspects of media usage such as how many impressions the media received. In some instances, to ensure that the reports generated by the audience measurement entity are useful to the media providers, it is advantageous to be able to associate media impressions with demographic information. For example, the reports may indicate a number of impressions of media grouped by demographic groups for a time period.

Companies and/or individuals want to understand the reach and effectiveness of the media that they produce and/or sponsor (e.g., through advertisements). In some examples, media that is associated with a larger number of impressions may be considered more effective at influencing user behavior because such media is seen by a larger number of people than some media with a fewer number of impressions.

Audience measurement entities (sometimes referred to herein as "ratings entities") traditionally determine media reach and frequency by monitoring registered panel members. That is, an audience measurement entity enrolls people who consent to being monitored into a panel. In such panelist-based systems, demographic information is obtained from a panelist when, for example, the panelist joins and/or registers for the panel. The demographic information (e.g., race, age or age range, gender, marital status, income, home location, education level, etc.) may be obtained from the panelist, for example, via a telephone interview, an in-person interview, by having the panelist complete a survey (e.g., an on-line survey), etc. In some examples, demographic information may be collected for a home (e.g., via a survey requesting information about members of the home). However, such panelist systems may be costly to implement at a scale appropriate for accurately identifying and/or estimating the number of exposures of media. Moreover, in view of the increasingly large amount of media distribution channels and media exposure possibilities, collecting a meaningful amount of panelist information (e.g., a statistically significant sample size) for each available media may not be practical.

Social messaging has become a widely used medium in which users disseminate and receive information. Online social messaging services (such as Twitter®, Facebook®, etc.) enable users to send social media messages or instant messages to many users at once. Some social messaging services enable users to "follow" or "friend" other users (e.g., subscribe to receive messages sent by select users (e.g., via the Twitter® service), status updates (e.g., via the Facebook® service or Google+™ social service), etc.). For example, a user following (e.g., subscribed to, online friends with, etc.) a celebrity using the Twitter® service may receive indications via a client application (e.g., the TweetDeck® client application or any other social media messaging client application) when the celebrity sends or posts a social media message.

Social media messages (sometimes referred to herein as "messages," "statuses," "texts" or "tweets") may be used to convey many different types of information. In some examples, social media messages are used to relay general information about a user. For example, a message sender may send a social media message indicating that they are bored. In some examples, social media messages are used to convey information regarding media, a media event, a product and/or a service. For example, a message sender may convey (e.g., self-report) a social media message indicating that the message sender is watching a certain television program, listening to a certain song, or just purchased a certain book. Social media messages may include different types of media such as, for example, images, moving images, video, etc. and/or text such as, for example, words, abbreviations, acronyms, hashtags, alphanumeric strings, etc. Media-exposure social media messages are social media messages that are disseminated to a mass audience and indicate exposure of at least one media to the sender of the message. In some examples disclosed herein, social media messages are collected and then filtered to identify media-exposure social media messages.

As used herein, a media-pairing is a combination of particular media presentations. In some examples, the media-pairing may include media with similar characteristics (e.g., genre). For example, a first media-pairing may include a broadcast of a golf tournament and a broadcast of a football game and a second media-pairing may include a first broadcast of a sitcom on a first network and a second broadcast of the sitcom on a second network at a different time than the first broadcast of the sitcom. In some examples, the media-pairing may include media with seemingly little similarity (e.g., cross-genre media). For example, a media-pairing may include a broadcast of a golf tournament and a broadcast of a daytime soap opera.

Examples disclosed herein use social media to identify related media-pairings. For example, a first set of social media messages regarding (e.g., referencing, mentioning, corresponding to, etc.) first media (e.g., a television program) are identified. In some disclosed examples, the first media is selected based on constraints provided for a media campaign. For example, the first media may be associated with a product such as golfing equipment based on, for example, a similar category as the product (e.g., a golfing event, a sports show, etc.), similar demographic information as the product (e.g., viewers of the first media may be similar to consumers of the product based on age, gender, marital status, income, geographic location, etc.), etc. Examples disclosed herein identify a second set of social media messages regarding second media. In some disclosed examples, the media is media that is a one-time event such as the Super Bowl, an awards ceremony, etc.

Examples disclosed herein estimate audiences for respective media using message information corresponding to identified social media messages. In some examples, audiences are estimated based on identified authors of social media messages. For example, disclosed examples may access message information identifying users who posted media-exposure social media messages referencing media (e.g., message authors) and estimate an audience for the media based on the identified authors. In some disclosed examples, the audiences are estimated based on users who access social media messages. For example, disclosed examples may obtain impression information for media-exposure social media messages referencing media and estimate an audience for the media based on identified users who were presented with the media-exposure social media messages.

In some examples, when determining the size of an audience, examples disclosed herein filter alias usernames and/or duplicate entries associated with a user. For example, a user may provide a first username (e.g., "Jon_Doe") to register an account with a first social media service and the user may provide a second username (e.g., "J_Doe_1") to register an account with a second social media service. In the illustrated example, if the user posts a first social media message referencing a hockey game while accessing the first social media service and posts second and third social media messages referencing the hockey while accessing the second social media service, examples disclosed herein may associate the three message postings with the same user and credit the media with one audience member. Furthermore, if the user is presented with a fourth social media message referencing the hockey game (e.g., while accessing the first social media service or the second social media service), examples disclosed herein associate the message access with the same user the user who posted the first three messages and the media is not credited with an additional audience member.

Examples disclosed herein classify media-pairings based on a subset of the estimated audiences. For example, examples disclosed herein identify a subset of the identified audience members who are overlapping audience members (e.g., audience members included in both audiences) such as user(s) who posted one or more social media message(s) and/or who were presented with one or more social media message(s) related to first media and to second media. In some disclosed examples, to classify a media-pairing, the number of overlapping audience members is compared with a threshold (e.g., 70%). For example, when an overlap ratio (sometimes referred to as an "intersection score" or a "pairing score") satisfies a relationship threshold (e.g., the number of overlapping audience members and total number of unique audience members for the first media or the second media meets and/or exceeds the relationship threshold), then the corresponding media is classified as related media. When the overlap ratio (e.g., the intersection score) fails to satisfy the relationship threshold (e.g., the number of overlapping audience members and total number of unique audience members for the first media or the second media fails to meet and/or exceed the relationship threshold), then the corresponding media is classified as unrelated media.

In some disclosed examples, the relationship threshold may depend on characteristics of the media and/or the media-pairing. For example, when first media is relatively expensive to air, media that is a one-time event and/or media that is viewed by a varying demographic (e.g., viewers of the Super Bowl include males and females, viewers between the ages of 9 and 60, married viewers and single viewers, etc.), the relationship threshold may be less than, for example, a relationship threshold value associated with on-going media (e.g., a television program having episodes, a serial, etc.).

In some disclosed examples, the relationship threshold may increase. For example, when the media-pairing includes media with a planned cross-over (e.g., a character from a first television program was advertised to be appearing in a second television program), the relationship threshold applied to the media-pairing may increase. Additionally or alternatively, when the media-pairing includes media associated with similar interests (e.g., a first media-pairing including media associated with cooking, a second media-pairing including media associated with football, etc.), the relationship threshold applied to the media-pairing may increase.

In some examples, the relationship threshold applied to a media-pairing may vary based on positive or negative influences of guests (e.g., celebrities, politicians, athletes, etc.). For example, a user who is not interested in a television program (e.g., a talk show) may watch the television program when a guest having a positive influence on the user (e.g., a football player) is appearing on the television program. For example, the relationship threshold applied to a media-pairing including the broadcast of the talk show with the football player and a broadcast of a football game may be increased to account for the expected increase in viewership in the talk show. Additionally or alternative, a user who is interested in the television program (e.g., the talk show) may avoid watching the television program when a guest having a negative influence on the user (e.g., a politician) is appearing on the television program. For example, the relationship threshold applied to a media-pairing including the broadcast of the talk show with the politician and another political-themed television program may be decreased to account for the expected decrease in viewership of the talk show. In some examples, the relationship threshold may be adjusted during broadcast of a television program. For example, the relationship threshold applied to a broadcast of the talk show and a broadcast of a football game may increase while the football player is on the talk show and then the relationship threshold may decrease when the politician is on the talk show.

Examples disclosed herein may utilize the related media-pairings to identify techniques for improving marketing for media such as the respective media and/or sponsored media. For example, examples disclosed herein may process the related media-pairings and improve marketing for products via exposure to cross-promotional media. For example, analysis of a broadcast of a golf tournament and a broadcast of a daytime soap opera may indicate that 71% of audience members who watched the broadcast of the golf tournament also watched the broadcast of the daytime soap opera. In the illustrated example, it may be beneficial to proprietors of golfing equipment to broadcast sponsored media related to their golfing equipment during future broadcasts of golf events and future broadcasts of the daytime soap opera.

Although examples disclosed herein are described in connection with two pieces of media (e.g., a "media-pairing"), disclosed techniques may additionally or alternatively be used in connection with any number of media (e.g., a "media-grouping"), such as three pieces of media, four pieces of media, etc. For example, disclosed examples may be used to identify a unique audience who was exposed to three different programs, etc.

As used herein, a media-exposure social media message is a social media message that references at least one media asset (e.g., media and/or a media event). As used herein, a media-exposure social media message of interest is a media-exposure social media message that (1) is posted to a social media site contemporaneously and/or near contemporaneously with a time-window of presentation of the corresponding media asset, and (2) is accessed (e.g., viewed) at the social media site contemporaneously and/or near contemporaneously with the time-window of presentation of the corresponding media asset. Media-exposure social media messages will typically include a message that conveys a sentiment about the media asset. For example, a media-exposure social media message may include the text "Jon Stewart is really funny on The Daily Show right now!"

FIG. 1 is a diagram of an example environment in which a system 100 constructed in accordance with the teachings of this disclosure operates to co-relationships between media using social media. The example system 100 of FIG. 1 includes a social media server 105 and a central facility 110 operated by an audience measurement entity (AME) 115. The example AME 115 of the illustrated example of FIG. 1 is an entity such as The Nielsen Company (US), LLC that monitors and/or reports exposure to media and operates as a neutral third party. The example AME 115 of FIG. 1 operates the central facility 110 to identify media-pairings in social media and to classify the identified media-pairings as, for example, related media-pairings or unrelated media-pairings.

The social media server 105 provides social media services to users 120 of the social media server 105. As used herein, the term social media services is defined to be a service provided to users to enable users to share information (e.g., text, images, data, etc.) in a virtual community and/or network. Example social media services may include, for example, Internet forums (e.g., a message board), blogs, micro-blogs (e.g., Twitter), social networks (e.g., Facebook, LinkedIn, Instagram, etc.), etc.

The example users 120 of the illustrated example of FIG. 1 are users of a social media service provided by the social media server 105. In the illustrated example, the example users 120 access the social media service using a media device 125 such as a mobile device (e.g., a cellular phone, a smartphone, a tablet, a phablet, a smart watch, etc.). However, the social media server 105 may be accessed in any other fashion such as, for example, using a laptop, a smart television, an in-vehicle infotainment system, etc. The example social media server 105 of the illustrated example of FIG. 1 records social media messages posted by users of the social media service and a timestamp(s) associated with the posting of the message(s).

The example social media server 105 of the illustrated example of FIG. 1 receives one or more queries from the AME 115 via a network 130. The example network 130 of the illustrated example of FIG. 1 is the Internet. However, the example network 130 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 130 enables the central facility 110 to be in communication with the social media server 105. As used herein, the phrase "in communication," including variances thereof, encompasses direct communication and/or indirect communication through one or more intermediary components and does not require direct physical (e.g., wired) communication and/or constant communication, but rather includes selective communication at periodic or aperiodic intervals, as well as one-time events.

The central facility 110 transmits the queries to gather social media messages of interest at periodic intervals (e.g., every 24 hours, every Monday, etc.). In the illustrated example, the one or more queries indicate media keywords, user identifiers and/or message identifiers. The media keywords are keywords that are associated with particular media (e.g., a television program) and result in social media messages that are relevant to the particular media being identified.

The example central facility 110 of the illustrated example of FIG. 1 inspects the social media messages returned by the social media server 105 for media mentioned in the social media messages. For example, the central facility 110 may identify the "The Daily Show" as media referenced in a media-exposure social media message including the text "Jon Stewart is really funny on The Daily Show right now!" In the illustrated example, when the central facility 110 identifies media referenced in a social media message, the social media message is a media-exposure social media message. The example central facility 110 stores information used for identifying media-exposure social media messages, user identifiers regarding the media-exposure social media messages and/or media in the media-exposure social media messages in a database.

As described below, the example central facility 110 of the illustrated example of FIG. 1 estimates the audiences of respective media based on identified media-exposure social media messages of interest. For example, the central facility 110 may estimate the audience for a television program by identifying unique authors of media-exposure social media messages related to the television program. In some examples, the central facility 110 may estimate the audience for a television program by identifying unique users who were presented media-exposure social media messages related to the television program.

The example central facility 110 of the illustrated example of FIG. 1 determines an overlap ratio for a media-pairing based on the audiences of the respective media. For example, the central facility 110 may determine the overlap ratio based on the number of unique audience members identified in two different sets of media-exposure social media messages related to two different pieces of media and the total number of unique audience members identified in each set of media-exposure social media messages. In some examples, the overlap ratio represents the number of unique authors who posted media-exposure social media messages of interest. In some examples, the overlap ratio represents the number of unique users who were presented with media-exposure social media messages of interest.

The example central facility 110 of the illustrated example of FIG. 1 classifies media-pairings based on a comparison of the overlap ratio calculated for the corresponding media and a relationship threshold. For example, when an overlap ratio satisfies the relationship threshold, the central facility 110 classifies the corresponding media-pairing a related media-pairing, and when the overlap ratio does not satisfy the relationship threshold, the central facility 110 classifies the media-pairing an unrelated media-pairing.

Figure 2:
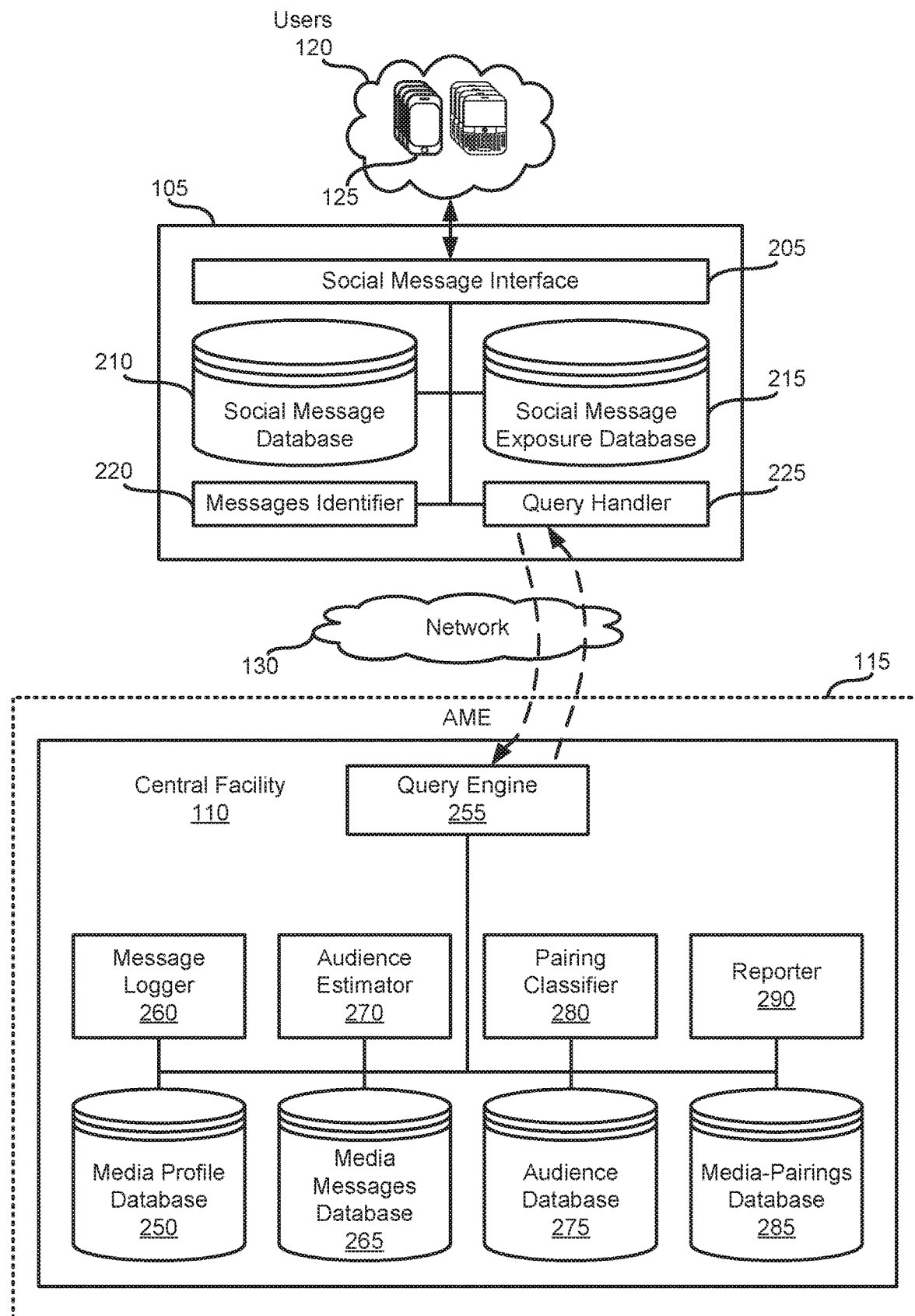
FIG. 2 is an example block diagram showing additional detail of one example of the example environment of FIG. 1.

FIG. 2 is a block diagram of an example environment in which the system 100 of FIG. 1 constructed in accordance with the teachings of this disclosure operates to identify co-relationships between media-pairings using social media. The example system 100 of FIG. 2 includes the social media server 105 and the central facility 110 operated by the audience measurement entity (AME) 115 of FIG. 1. The social media server 105 provides social media services to users 120 of the social media server 105. The example social media server 105 of FIG. 2 includes a social message interface 205, a social message database 210, a social message exposure database 215, a messages identifier 220, and a query handler 225.

The example social media server 105 receives queries from the central facility 110 via the example network 130. The example network 130 of the illustrated example of FIG. 2 is the Internet. However, the example network 130 may be implemented using any suitable wired and/or wireless network(s) including, for example, one or more data buses, one or more Local Area Networks (LANs), one or more wireless LANs, one or more cellular networks, one or more private networks, one or more public networks, etc. The central facility 110 transmits the queries to gather social media messages of interest.

The example users 120 of the illustrated example of FIG. 2 are users of a social media service provided by the social media server 105. In the illustrated example, the user(s) 120 signs into an online social media service with a user identifier to read and/or convey (e.g., post, send, etc.) social media messages. Users may then follow other users (e.g., subscribe to messages of the other users) using the user identifier(s).

The example social message interface 205 of the illustrated example of FIG. 2 enables users to post social media messages. For example, when the user 120 operates their media device 125, the social message interface 205 receives a social media message composed by the user 120. In examples disclosed herein, the social message interface 205 records social media messages that were received for posting in the social message database 210.

In some examples, the social message interface 205 also enables users to receive social media messages posted to the social message service. For example, when the user 120 operates their media device 125, the social message interface 205 receives a request for social media messages to be presented to the user. The social message interface 205 gathers messages to be transmitted to the requesting user 120. In the illustrated example, the social message interface 205 gathers messages that were posted by users to whom the requesting user 120 has subscribed. However, in some examples, the requesting user may have requested social media messages that were posted by a user other than a user to whom the requesting user has subscribed.

In examples disclosed herein, the example social message interface 205 records when an impression of a social media message occurs in the social message exposure database 215. In the illustrated example, impressions are recorded when the social media message is transmitted to the user. However, in some examples, the impressions are recorded when a receipt message is received from the media device indicating that the social media message was presented to the user.

The example social message database 210 of the illustrated example of FIG. 2 records social media messages posted by users of the social media service and a timestamp (s) associated with the posting of the message(s). In some examples, a username (e.g., a "handle," a screen name, a unique serial identifier, etc.) of the user posting the social media message (e.g., a messages author) is stored. Storing the username of the posting user enables identification that the social media message should be presented to a user who is subscribed to receive message posted by the author. An example data table 300 of the illustrated example of FIG. 3 illustrates example data that may be stored in the example social message database 210. The example social message database 210 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example social message database 210 may additionally or alternatively be implemented by one or more double data rate (DDR) memories, such as DDR, DDR2, DDR3, mobile DDR (mDDR), etc. The example social message database 210 may additionally or alternatively be implemented by one or more mass storage devices such as hard disk drive(s), compact disk drive(s), digital versatile disk drive(s), etc. While in the illustrated example the social message database 210 is illustrated as a single database, the social message database 210 may be implemented by any number and/or type(s) of databases.

The example social message exposure database 215 of the illustrated example of FIG. 2 stores social media message exposure information. In examples disclosed herein, the social media message information includes a message identifier, a timestamp indicating the time of exposure and a user identifier to whom the social media message was presented. The example social message exposure database 215 is useful because it enables identification of users who were presented with a particular message of interest during a given time range. The example social message exposure database 215 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example social message exposure database 215 may additionally or alternatively be implemented by one or more double data rate (DDR) memories, such as DDR, DDR2, DDR3, mobile DDR (mDDR), etc. The example social message exposure database 215 may additionally or alternatively be implemented by one or more mass storage devices such as hard disk drive(s), compact disk drive(s), digital versatile disk drive(s), etc. While in the illustrated example the social message exposure database 215 is illustrated as a single database, the social message exposure database 215 may be implemented by any number and/or type(s) of databases.

The example messages identifier 220 of the illustrated example of FIG. 2 gathers social media message exposure information identifying the list of users that were presented with a media-exposure social media message that meets the criteria of a request received from the AME 115 via the example query handler 225. The example messages identifier 220 inspects the example social message database 210 and/or the example social message exposure database 215 to identify social media message(s) and a list of users associated with those identified social media messages that include keywords of interest and where the exposure occurred during a first time period (e.g., within a particular five minute interval of a live television presentation).

In some examples, the exposure messages identifier 220 further limits results to social media messages that were presented during a second time period (e.g., social media messages that were posted ten minutes or less before the airing of the live television presentation, social media messages that were posted during the airing of the live television presentation, etc.). In some examples, the first time period and the second time period are the same (e.g., resulting in identification of social media messages that were both posted and viewed in the same time period). In the illustrated example of FIG. 2, the example messages identifier 220 operates SQL queries against the example social message database 210 and/or the example social message exposure database 215 to identify social media message(s) and a list of users associated with those identified social media messages. However, any other approach to accessing the data may additionally or alternatively be used.

The example query handler 225 of the illustrated example of FIG. 2 receives one or more queries from the AME 115 via the network 130. In the illustrated example, the one or more queries indicate media keywords, time periods and/or message identifiers. The media keywords are keywords that are associated with particular media (e.g., a television show) and result in social media messages that are relevant to the particular media being identified. In examples disclosed herein, the media keywords are selected by the AME 115 to closely correspond to media of interest. For example, the media keywords may include a title of the media, an episode name, a name of a character in the media, a name of an actor, a phrase used in the media, etc.

In the illustrated example, the one or more queries received from the AME 115 indicate a time period of social media message exposure of interest. In the illustrated example, the time period is represented by a start time and a stop time. However, the time period may be represented in any other fashion such as, for example, a start time and duration. Moreover, in some examples, the query may request that the results be divided into smaller intervals (e.g., return results for a 30 minute television show broken down by five minute intervals).

In some examples, the social media server 105 provides a list of usernames (e.g., a "handle," a screen name, a unique serial identifier, etc.) to the AME 115. For example, the AME 115 may want to identify the one or more users 120 who were presented with a particular media-exposure social media message of interest. In the illustrated example, the one or more queries received from the AME 115 may indicate a particular media-exposure social media message of interest. For example, each social media message that is recorded in the example social message database 210 may be assigned a message identifier that may be used to identify a particular social media message. An important aspect of any monitoring system is maintaining the privacy of those users who are monitored in accordance with their wishes. To that end, the social media server 105 does not provide user names identifying users who were presented with a social media message. Instead, the example messages identifier 220 obfuscates the user identifier information. In some examples, the messages identifier 220 obfuscates the user identifier information in a manner so that the same obfuscated user identifier information corresponds to the same user. In this manner, user activities may be monitored for particular users without exposing sensitive information regarding the user. However, any other approach to protecting the privacy of a user may additionally or alternatively be used.

The example query handler 225 interacts with the example messages identifier 220 to gather results to transmit to the AME 115 in response to the query received from the AME 115. As such, the example query handler 225 provides a unified interface from which the central facility 110 can request social media messages and/or impression information. An example data table 500 representing example results returned to the AME 115 by the example query handler 225 is shown in the illustrated example of FIG. 5.

The example AME 115 of the illustrated example of FIG. 2 is an entity such as The Nielsen Company (US), LLC that monitors and/or reports exposure to media and operates as a neutral third party. That is, the audience measurement entity does not produce, provide and/or sponsor media to end users. This un-involvement with the media proprietors (e.g., the companies and/or individuals that produce, provide and/or sponsor media) ensures the neutral status of the audience measurement entity and, thus, enhances the trusted nature of the data it collects. The reports generated by the AME 115 may identify co-relationships between media-pairings using social media and uses for related media-pairings.

The example AME 115 operates the central facility 110 to monitor and/or report the exposure to media. The example central facility 110 of the illustrated example of FIG. 2 may include one or more servers operated by the AME 115. Although only one central facility 110 is shown in FIG. 2, many facilities may be provided for collecting the data. In some examples, these data collection facilities are structured in a tiered approach with many satellite collection facilities collecting data and forwarding the same to one or more central facilities 110. The example central facility 110 includes a media profile database 250, a query engine 255, a message logger 260, a media messages database 265, an audience estimator 270, an audience database 275, a pairing classifier 280, a media-pairings database 285 and a reporter 290.

The example media profile database 250 of the illustrated example of FIG. 2 stores media profile information such as a media identifier, a media time range and media keywords. The media profile information stored by the media profile database 250 enables the example query engine 255 to generate a query to transmit to the social media server 105. An example data table 400 representing the example media profile information is represented in the illustrated example of FIG. 4. The example media profile database 250 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example media profile database 250 may additionally or alternatively be implemented by one or more double data rate (DDR) memories, such as DDR, DDR2, DDR3, mobile DDR (mDDR), etc. The example media profile database 250 may additionally or alternatively be implemented by one or more mass storage devices such as hard disk drive(s), compact disk drive(s), digital versatile disk drive(s), etc. While in the illustrated example the media profile database 250 is illustrated as a single database, the media profile database 250 may be implemented by any number and/or type(s) of databases.

The example query engine 255 of the illustrated example of FIG. 2 generates queries to be transmitted to the social media server 105. In the illustrated example, the query engine 255 reads media profiles from the media profile database 250 and generates a query (or queries) requesting some or all social media messages containing media keywords (from the media profiles) and that were posted during a particular time window (as indicated by the media profile). Based on the times at which various media is presented, the example query engine 255 determines which queries should be generated. For example, queries related to a television show that airs on Thursday evening need not be transmitted to identify exposure to social media messages referencing the television show on a Monday morning, as exposure to social media messages on Monday morning is not likely to have an effect on the audience on Thursday evening.

In some examples, in addition to and/or as an alternative to generating a query based on media keywords, the example query engine 255 generates queries requesting impression information associated media-exposure social media messages of interest. For example, the AME 115 may want to identify the users who were presented media-exposure social media messages of interest (e.g., social media messages referencing a golf tournament, etc.). In some such examples, the query engine 255 may generate a query (or queries) requesting message impression information including a list of usernames by providing message identifiers corresponding to the media-exposure social media messages of interest. However, any other query criteria may additionally or alternatively be used for preparing queries.

In examples disclosed herein, the example query engine 255 generates queries to be transmitted at periodic intervals (e.g., every 24 hours, every Monday, etc.). However, any other time period may additionally or alternatively be used for preparing queries. For example, the query engine 255 may generate queries at aperiodic intervals (e.g., when requested) and/or as a one-time event. Additionally or alternatively, instead of generating queries as they are to be transmitted, the example query engine 255 may generate queries ahead of time and cache the pre-generated queries.

The example query engine 255 of the illustrated example of FIG. 2 transmits the queries to the query handler 225. In the illustrated example, the queries are transmitted via the network 130 as the results of those queries are needed for analysis (e.g., at the end of a time period). For example, a query may request social media message(s) and/or message impression information relevant to a particular piece of media and/or a particular media-exposure social media message of interest. However, in some examples, the queries may be transmitted to the query handler 225 ahead of time, and results may be returned upon expiration of the time period. In the illustrated example, the queries and their associated results are transmitted via the network 130. However, the queries and their associated results may be transmitted in any other fashion. In response to the query, the example query engine 255 receives information associated therewith relevant to the particular social media messages of interest (e.g., a message identifier, the time when the message was posted, the content of the message, impression information, etc.) and/or a list of usernames. An example data table 500 representing responses to queries is shown in the illustrated example of FIG. 5.

The example message logger 260 of the illustrated example of FIG. 2 inspects the social media messages returned by the query handler 225 for media-exposure social media messages. For example, media of interest may be "The Daily Show with Jon Stewart." In such instances, a media-exposure social media message of interest may include the text "Jon Stewart is really funny on The Daily Show right now!" and may include a message timestamp indicating that the media-exposure social media message was posted by the message author during broadcast of the media of interest.

In contrast, a non-media-exposure social media message may include reference a reference to media of interest (e.g., one or more media keyword(s) associated with media of interest (e.g., the text "Just ran into Jon Stewart from The Daily Show at my favorite pizza parlor!")), but does not include a characteristic indicating exposure to the media of interest (e.g., the message may not have been posted by the message author during broadcast times associated with the television show). Moreover, additional techniques, such as natural language processing may be used to identify whether a social media message is likely to be a media-exposure social media message.

The example message logger 260 of FIG. 2 stores information collected from media-exposure social media messages in the example media messages database 265. For example, they message logger 260 may log a media identifier, a message identifier and a message author. An example data table 500 representing example data that may be stored by the example message logger 260 is shown in the illustrated example of FIG. 5.

In some examples, the message logger 260 requests impression information related to identified media-exposure social media messages. In the illustrated example, the message logger 260 reads the message identifier associated with a media-exposure social media message and prompts the query engine 255 to generate a query (or queries) requesting impression information associated with the message. In some examples, the social media server 105 provides impression information associated with the message including, for example, obfuscated usernames representing users who were presented the media-exposure social media message. In some examples, the message logger 260 parses the returned impression information to verify that the impression information corresponds to exposure to the media of interest. The example message logger 260 of FIG. 2 records the impression information, including the returned usernames, in the media messages database 265.

In the illustrated example, the message logger 260 stores the media-exposure social media message-related information in the media messages databases 265. For example, the message logger 260 stores a media identifier, a message identifier, a message author identifier and/or a message viewer identifier in the media messages database 265. An example data table 500 representing example data that may be stored by the example message logger 260 is shown in the illustrated example of FIG. 5. The example media messages database 265 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example media messages database 265 may additionally or alternatively be implemented by one or more double data rate (DDR) memories, such as DDR, DDR2, DDR3, mobile DDR (mDDR), etc. The example media messages database 265 may additionally or alternatively be implemented by one or more mass storage devices such as hard disk drive(s), compact disk drive(s), digital versatile disk drive(s), etc. While in the illustrated example the media messages database 265 is illustrated as a single database, the media messages database 265 may be implemented by any number and/or type(s) of databases.

The example audience estimator 270 of the illustrated example of FIG. 2 inspects the social media messages recorded in the media messages database 265 to estimate audiences for media. In the illustrated example, the audience estimator 270 estimates an audience for a media based on a number of unique audience members using social media. For example, the audience estimator 270 of FIG. 2 may parse the social media messages stored in the media messages database 265 and identify the media-exposure social media messages that reference particular media (e.g., a golf tournament) and the unique authors who posted media-exposure social media messages of interest. The example audience estimator 270 of FIG. 2 stores a media identifier, the number of media-exposure social media messages related to the media of interest and a number of unique authors who posted the media-exposure social media messages related to the media of interest in the example audience database 275. For example, if the audience estimator 270 identifies a first media-exposure social media message that references a golf tournament and was posted by a first author, identifies a second media-exposure social media message that references the golf tournament and was posted by a second author, and identifies a third media-exposure social media message that references the golf tournament and was also posted by the first author, the example audience estimator 270 records in the audience database 275 that three media-exposure social media messages referencing a golf tournament were posted by two unique authors.

Additionally or alternatively, the example audience estimator 270 of FIG. 2 may estimate the audience for media of interest based on a number of unique users who were presented media-exposure social media messages of interest. For example, the audience estimator 270 may inspect the media messages database 265 and determine that the first media-exposure social media message posted by the first author was presented to a first user, a second user and a third user, the second media-exposure social media message posted by the second author was presented to the second user and a fourth user, and that the third media-exposure social media message posted by the first author was presented to the first user, the second user, the third user and a fifth user. In such instances, the example audience estimator 270 may record in the audience database 275 that three media-exposure social media messages referencing a golf tournament were presented to five unique users.

In some examples, the audience estimator 270 of FIG. 2 may estimate the audience media of interest based on the number of unique authors and the number of unique users presented media-exposure social media messages of interest. For example, with reference to the above example, the audience estimator 270 may record in the audience database 275 that three media-exposure social media messages referencing a golf tournament were posted and that eight total unique audience members (e.g., three authors plus five users who were presented the media-exposure social media messages of interest) were identified. Moreover, in some examples, the audience estimator 270 may adjust the size of the audience if, for example, an author who posted a media-exposure social media message was also a user who was presented a media-exposure social media message. For example, in the above example, if the first author who posted the first and third media-exposure social media messages was also the fourth user who was presented the second media-exposure social media message, than the total unique audience members is seven. However, any other approach to estimating audiences and/or audience sizes may additionally or alternatively be used.

In the illustrated example, the audience estimator 270 stores the audience-related information in the audience databases 275. For example, the audience estimator 270 stores a media identifier, a number of media-exposure social media messages and a total audience size related to media of interest (e.g., the number of unique authors and/or unique users presented media-exposure social media messages of interest) in the audience database 275. An example data table 600 representing example data that may be stored by the example audience estimator 270 is shown in the illustrated example of FIG. 6. The example audience databases 275 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example audience databases 275 may additionally or alternatively be implemented by one or more double data rate (DDR) memories, such as DDR, DDR2, DDR3, mobile DDR (mDDR), etc. The example audience databases 275 may additionally or alternatively be implemented by one or more mass storage devices such as hard disk drive(s), compact disk drive(s), digital versatile disk drive(s), etc. While in the illustrated example the audience databases 275 is illustrated as a single database, the audience databases 275 may be implemented by any number and/or type(s) of databases.

The example pairing classifier 280 of the illustrated example of FIG. 2 classifies a media-pairing based on information stored in the media messages database 265 and the audience database 275. In the illustrated example, the pairing classifier 280 selects first media and second media from the audience database 275 and determines the number of overlapping audience members. For example, the pairing classifier 280 may parse the media messages database 265 for media-exposure social media messages related to the first media of interest and generate a first set of audience members based on the unique authors of and/or the unique users who were presented the media-exposure social media messages related to the first media of interest. The example pairing classifier 280 may then parse the media messages database 265 and generate a second set of audience members based on the unique authors of and/or the unique users who were presented media-exposure social media messages related to second media of interest. The example pairing classifier 280 compares the audience members included in the first set and the second set to identify overlapping users (e.g., audience members identified in the first set of audience members and the second set of audience members).

In the illustrated example, the pairing classifier 280 selects the first media and the second media based on the different media for which media-exposure social media messages were identified. In some such examples, the number of media-pairings may correspond to the number of combinations of the identified media. For example, one media-pairing when the number of media identified is two, three media-pairings when the number of media identified is three, six media-pairings when the number of media identified is four, etc. However, any other approach for selecting the first media and/or the second media may additionally or alternatively be used. For example, the pairing classifier 280 may not select two episodes of the same television program as the first media and the second media. Excluding different airings of the same television show (e.g., episodes one and two of season one of a sitcom, an episode or media event that airs on different broadcasting networks (e.g., the State of the Union Address), a syndicated television program that airs on multiple broadcasting networks, etc.) may be advantageous for conserving computing resources as the same television program is likely to have the same audience.

Additionally or alternatively, a media-pairing may be skipped when the media are known to be demographically dissimilar. For example, the majority of the audience of a first television program may be audience members who are between the ages of 60 and 70 and the majority of the audience of a second television program may be audience members who are between the ages of 13-20. In some such examples, because the demographics for the respective media are not similar (e.g., do not overlap), the example pairing classifier 280 may not select the first television program and the second television program for classifying.

In the illustrated example of FIG. 2, the pairing classifier 280 calculates an intersection score for the media-pairing (e.g., the first media and the second media) based on the number of overlapping users and total number of unique audience members. In the illustrated example, the pairing classifier 280 selects one of the total audience sizes for the media of interest when calculating the intersection score. For example, the pairing classifier 280 may query and/or retrieve the total audience sizes for the media of interest of the media-pairing (e.g., the first media and the second media) from the audience database 275 and select the lesser of the two returned values. In the illustrated example, the pairing classifier 280 calculates the intersection score for the media-pairing based on a ratio of the number of overlapping users and the selected total audience size. However, any other approach to calculate an intersection score between media-pairings may additionally or alternatively be used. For example, the pairing classifier 280 may calculate two intersection scores for the media-pairing (e.g., a first intersection score corresponding to the total number of audience members for the first media and a second intersection score corresponding to the number of audience members for the second media) and select the higher of the two intersections scores to record in the media-pairings database 285.

The example pairing classifier 280 records media identifiers for the media-pairing, the number of overlapping users and the intersection score in the example media-pairings database 285. In some examples, if the number of overlapping users and/or the total number of audience members for one or both media is less than a threshold (e.g., a size threshold), then the pairing classifier 280 discards (e.g., skips) calculating the intersection score for the media-pairing and no relationship between the first media and the second media is determined. For example, if the number of overlapping users and/or the total number of audience members for one or both media is less than the size threshold, the potential gain in sales may not be cost-effective with respect to the cost of purchasing broadcasting time for the media-pairing and/or producing sponsored media. For example, an entity (e.g., an advertiser) may project that 10% of audience members exposed to an advertisement will buy the advertised product for $50. Furthermore, the entity may estimate the cost of producing and broadcasting the advertisement is $100,000. In the illustrated example, the size threshold may be set to an absolute number (e.g., 20,000 users), because if the number of overlapping users and/or the total number of audience members is less than 20,000, the entity would not recover the cost of producing and broadcasting the advertisement.

In the illustrated example of FIG. 2, the pairing classifier 280 classifies the media-pairing by comparing the intersection score calculated for the media-pairing to a relationship threshold. When a media-pairing satisfies the relationship threshold (e.g., the intersection count calculated for the first media and the second media is greater than or equal to the relationship threshold), the pairing classifier 280 classifies the media-pairing related media. When the media-pairing fails to satisfy the relationship threshold (e.g., the intersection count calculated for the first media and the second media is less than the relationship threshold), the pairing classifier 280 classifies the media-pairing unrelated media. However, other approaches to differentiate between related media-pairings and unrelated media-pairings may additionally or alternatively be used.

As disclosed herein, the size threshold and/or the relationship threshold is/are derived from an empirical study of overlapping audience members using social media. For example, analysis of data sets (e.g., test data sets, previously processed data sets, etc.) may indicate that when a media-pairing has an intersection score that is less than 70%, the effect the media included in the media-pairing has on each other may not be statistically significant. In some such examples, the relationship threshold may be set to a default value (e.g., 70%). However, the size threshold and/or the relationship threshold may be derived in any other fashion. For example, the relationship threshold may be determined by preferences specified by the AME 115 and/or an entity requesting a report. In some examples, the relationship threshold may adjust based on characteristics of the first media and/or the second media. For example, if the first media and/or the second media includes an appearance by a positive influence guest (e.g., a guest such as a celebrity, a politician, an athlete, etc. whose appearance in media causes an increase in viewership of the media), the pairing classifier 280 may increase the relationship threshold (e.g., +5%). If the first media and/or the second media includes a negative influence guest (e.g., a guest whose appearance in media causes a decrease in viewership of the media), the pairing classifier 280 may decrease the relationship threshold (e.g., −5%). In some examples, a planned cross-over between the first media and the second media may cause the pairing classifier to increase the relationship threshold (e.g., +15%). In some examples, if the first media and/or the second media is a one-time event (e.g., a league championship, an awards ceremony, etc.), the pairing classifier 280 may decrease the relationship threshold (e.g., −30%). However, any other qualifications for adjusting the size threshold and/or the relationship threshold may additionally or alternatively be used. For example, the relationship threshold may adjust based on the cost of airing sponsored media during one or both media in the media-pairing. For example, the potential gains in sales due to broadcasting during a media event (e.g., a one-time event such as a league championship, an awards ceremony, etc.) may not be cost-effective with respect to the cost of purchasing broadcast time during the television program.

The example pairing classifier 280 of the illustrated example stores the media-pairing classifications in the media-pairings database 285. The example pairing classifier 280 classifies and/or re-classifies the media-pairings at periodic intervals (e.g., every 24 hours, every Monday, etc.). However, any other time period may additionally or alternatively be used for classifying and/or re-classifying the media-pairings. For example, the pairing classifier 280 may classify and/or re-classify the media-pairings at aperiodic intervals (e.g., when requested, each time the media-pairings database 285 is updated (e.g., a new media profile is added to the media profile database 250, a new entry is added to the media messages database 265 by the message logger 260, a new entry is added to the audience database 275 by the audience estimator 270), etc.) and/or as a one-time event.

An example data table 700 representing example data that may be stored in the example media-pairings database 285 is shown in the illustrated example of FIG. 7. The example media-pairings database 285 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example media-pairings database 285 may additionally or alternatively be implemented by one or more double data rate (DDR) memories, such as DDR, DDR2, DDR3, mobile DDR (mDDR), etc. The example media-pairings database 285 may additionally or alternatively be implemented by one or more mass storage devices such as hard disk drive(s), compact disk drive(s), digital versatile disk drive(s), etc. While in the illustrated example the media-pairings database 285 is illustrated as a single database, the media-pairings database 285 may be implemented by any number and/or type(s) of databases.

The example reporter 290 of the illustrated example of FIG. 2 generates one or more reports classifying media-pairings as related media or unrelated media. In the illustrated example of FIG. 2, the example reporter 290 identifies one or more media-pairing(s) of interest and provides the media identifiers to the pairing classifier 280 based on, for example, specifications provided by an entity requesting the report (e.g., a sponsored media proprietor). In some examples, the reports are presented to the proprietors of media included in the media-pairings.

In some examples, the reporter 290 may provide a variety of use cases based on the related media-pairings. As an illustrative example, consider an example in which a relatively large percentage (e.g., 71%) of audience members of a broadcast of a golf tournament are also audience members of a daytime family court show. The example reporter 290 may identify the related media-pairing (e.g., the golf tournament broadcast and daytime family court show) and provide recommendations to a proprietor of golf equipment.

In some examples, the reporter 290 may recommend cross-promotion opportunities available to the golf equipment proprietors. In some examples, the cross-promotion opportunities may include first and second media that are known (e.g., the daytime family court show and another daytime program that is broadcast by the same network that broadcasts the daytime family court show). Additionally or alternatively, the cross-promotion opportunities may include first and second media that are not known (e.g., the golf tournament is broadcast by a first network and the daytime family court show is broadcast by a second network). For example, it may be advantageous for the golf equipment proprietors to broadcast sponsored media for their golf equipment during future broadcasts of golf tournaments and during broadcasts of the daytime family court show. In some such examples, the proprietors of the golf equipment may increase exposure to their golf equipment.

In another illustrative example, the reporter 290 may recommend broadcasting their golf equipment sponsored media during broadcasts of the daytime family court show instead of during future broadcasts of golf tournaments. In some such examples, because of the relatively large overlap of audience members of related media, the golf equipment proprietors may be able to reach a similar audience for less money.

In another illustrative example, the reporter 290 may recommend broadcasting their golf equipment sponsored media during broadcasts of media based on one or more intermediary media. For example, in the above example, a first media-pairing includes the golf tournament broadcast and the daytime family court show. In some examples, the reporter 290 may identify a second media-pairing including the daytime family court show. For example, the reporter 290 may determine that a relatively large percentage (e.g., 75%) of audience members of the daytime family court show are also audience members of an animal adventures serial. In such instances, although the number of audience members who watch the golf tournament broadcast and the animal adventures serial may not be large enough to indicate a relationship between the media-pairing (e.g., the number of overlapping audience members does not satisfy a relationship threshold), the reporter 290 may recommend broadcasting during the animal adventures serial based on the second media-pairing relationship.

FIG. 3 is an example data table 300 that may be stored by the example social media server 105 of FIGS. 1 and/or 2 to store social media messages. The example data table 300 of the illustrated example of FIG. 3 includes a message identifier column 310, a message posting timestamp column 320, a message column 330 and a message author column 340. The example message identifier column 310 indicates an identifier of a message posted using the social media service provided by the social media server 105. In the illustrated example, the message identifier is a unique serial identifier. However, any other approach uniquely identifying a message may additionally or alternatively be used.

The example message posting timestamp column 320 indicates a date and/or time at which the message identified by the message identifier column 310 was posted on the social media service. The example message column 330 indicates the message that was posted to the social media service. The example message author column 340 identifies a username of the user that posted the social media message to the social media service provided by the social media server 105. The example message author column 340 is used by the social media server 105 when providing social media messages to users.

The example data table 300 of the illustrated example of FIG. 3 includes three example rows 360, 370, 380 corresponding to three example social media messages. The example first row 360 indicates that a message having an identifier of "0001" and a text of "Going to see his when it comes out! So funny on #TalkShow" was posted by "@User-123" at 10:12 PM on Aug. 6, 2015. The example second row 370 indicates that a message having an identifier of "0002" and a text of "That's why she is the best #golfer in the world! #Championships" was posted by "@Golf-Fan" at 3:23 PM on Aug. 11, 2015. The example third row 380 indicates that a message having an identifier of "0003" and a text of "Why can't they all get along? #FamilyCourt" was posted by "@User-ABC" at 11:11 AM on Aug. 15, 2015. While three example messages are represented in the example data table 300 of FIG. 3, more or fewer social media messages may be represented in the example data table 300 corresponding to the many messages posted to the social media service provided by the social media server 105.

FIG. 4 represents an example data table 400 that may be stored by the AME 115 of FIGS. 1 and/or 2 representing media presentation time ranges and media keywords associated with different media. The example data table 400 of the illustrated example of FIG. 4 is stored in the example media profile database 250. The example data table 400 of the illustrated example of FIG. 4 includes a media identifier column 410, a media time range column 420 and a media keyword(s) column 430. The media identifier column 410 identifies media (e.g., a television show, a movie, etc.). In the illustrated example, television shows aired via a broadcast television system are identified. However, any other type of media may additionally or alternatively be used. The example media time range column 420 includes media presentation time ranges that may be used by the example central facility 110 to determine whether media-exposure social media messages should be requested in associated with a media presentation. In some examples, the media time ranges are repeated time ranges in that the media is expected to air periodically (e.g., once a week, once a month, every day, on weekdays, etc.). However, any other approach to identifying when media is expected to air, periodic and/or aperiodic, may additionally or alternatively be used.

The example media keywords of the example media keyword(s) column 430 are used when querying the social media server 105 to retrieve social media messages that are media-exposure social media messages that are associated with particular media (e.g., the media identified by the media identifier column 410). In the illustrated example, the media keywords are represented using a text string, with various keywords and/or phrases separated by semicolons. However, any other approach to storing the media keywords may additionally or alternatively be used.

The example data table 400 of the illustrated example of FIG. 4 includes three example rows 450, 460, 470. The example first row 450 identifies that the Aug. 6, 2015, airing of "Talk Show" has a time range between 9:30 PM and 10:30 PM (CT) on weekdays and is identifiable using the media keywords "Talk Show; Comedian; Funny." The example second row 460 identifies that the Aug. 11, 2015, airing of "Golf Tournament" has a time range between 4:00 PM and 7:00 PM (CT) on Aug. 11, 2015, and is identifiable using the media keywords "Golf; Championships; Golfer."

The example third row 470 identifies that the Aug. 15, 2015, airing of "Family Court" has a time range between 11:00 AM and 12:00 PM (CT) on weekdays, and is identifiable using the media keywords "Family; Daytime; Court."

FIG. 5 is an example data table 500 representing example social media messages and impression information associated with the social media messages that may be supplied to the message logger 260 of the example central facility 110 of FIGS. 1 and/or 2 by the social media server 105 of FIGS. 1 and/or 2. The example data table 500 of the illustrated example of FIG. 5 includes a media identifier column 510, a message identifier column 520, a message author column 530 and a message viewer column 540.

The example media identifier column 510 identifies media (e.g., a television show, a movie, etc.). In the illustrated example, television shows aired via a broadcast television system are identified. However, any other type of media may additionally or alternatively be used. The example message identifier column 520 indicates an identifier of a message posted using the social media service provided by the social media server 105. The message identifier is useful to the example central facility 110 to map impression information to a previously processed social media message. Reusing previously identified social media messages reduces the amount of processing requirements of the central facility 110. The example message author column 530 identifies a username of the user that posted the social media message to the social media service provided by the social media server 105. The example message viewer column 540 identifies a username of a user that was presented the social media message.

The example data table 500 includes three example rows corresponding to social media message information and/or impression information for social media messages returned by the social media server 105. An example first row 560 indicates that the social media message corresponding message identifier "0002" references the "08/11/2015 Golf Tournament" and was posted by "@Golf-Fan." The example first row 560 does not identify a user who was presented the social media message. An example second row 570 indicates that the social media message corresponding to the message identifier "0002" references the "08/11/2015 Golf Tournament" and was presented to "@Sports_Star." An example third row 580 indicates that the social media message corresponding to the message identifier "0002" references the "08/11/2015 Golf Tournament" and was presented to "@User-ABC."

FIG. 6 represents an example media audience data table 600 that may be stored by the example AME 115 of FIG. 1 and/or representing example estimates of audiences for media. The example data table 600 of the illustrated example of FIG. 6 is stored in the example audience database 275. The example data table 600 of the illustrated example of FIG. 6 includes an example media identifier column 610, an example number of messages identifier column 620 and an example number of unique audience members identifier column 630. The example media identifier column 610 identifies media (e.g., a television show, a movie, etc.). In the illustrated example, television shows aired via a broadcast television system are identified. However, any other type of media may additionally or alternatively be used.

The example number of messages identifier column 620 identifies the number of media-exposure social media messages were identified for the media identified in the media identifier column 610. The example number of unique audience members identifier column 630 identifies an estimated audience size for the media identified in the media identifier column 610. In the illustrated example, the number of unique message authors referencing the media identified in the media identifier column 610 in social media messages is identified. However, any other type of estimation technique may additionally or alternatively be used. For example, the number of unique audience members may represent the number of unique message authors and/or the number of unique users who were presented media-exposure social media messages of interest.

In the illustrated example of FIG. 6, the example data table 600 includes three example rows 650, 660, 670. The first example row 650 indicates that a total number of 13,597 social media messages referencing the Aug. 7, 2015, broadcast of "Talk Show" were posted using the social media service provided by the social media server 105 by a total number of 9,541 different users. The second example row 660 indicates that a total number of 105,997 social media messages referencing the Aug. 11, 2015, broadcast of "Golf Tournament" were posted using the social media service provided by the social media server 105 by a total number of 68,753 different users. The third example row 670 indicates that a total number of 590 social media messages referencing the Aug. 15, 2015, broadcast of "Family Court" were posted using the social media service provided by the social media server 105 by a total number of 570 different users.

FIG. 7 represents an example data table 700 that may be stored by the example AME 115 of FIGS. 1 and/or 2 representing identified media-pairings and whether the respective media are related. The example data table 700 of the illustrated example of FIG. 7 is stored in the example media-pairings database 285. The example data table 700 of the illustrated example of FIG. 7 includes an example first media identifier column 705, an example second media identifier column 710, an example number of overlapping audience members identifier column 715, an example smallest number of unique audience members identifier column 720, an example pairing score identifier column 725, an example threshold applied identifier column 730 and an example media related identifier column 735.

The example first media identifier column 705 and the example second media identifier column 710 identify the media of interest, respectively, included in the media-pairing. The example number of overlapping audience members identifier column 715 represents the number of users identified as audience members for both media identified in the media identifier columns 705, 710. In the illustrated example, the number of overlapping users corresponds to the number of users who posted one or more media-exposure social media message(s) referencing the first media identified in the first media identifier column 705 and who also posted one or more media-exposure social media message(s) referencing the second media identified in the second media identifier column 710. For example, the pairing classifier 280 may compare the usernames included in a first set of usernames (e.g., audience members) associated with the first media and the usernames included in a second set of usernames associated with the second media and count the number of overlapping usernames. However, any other approach for determining a number of overlapping audience members may additionally or alternatively be used.

The example smallest number of unique audience members identifier column 720 represents the smaller number of total audience members for the media identified in the media identifier columns 705, 710. In the illustrated example, the smallest number of unique audience members is determined based on the number of unique audience members listed in the example data table 600 of FIG. 6 for the respective media.

The example pairing score identifier column 725 identifies the intersection in audience members for the media identified in the media identifiers columns 705, 710. In the illustrated example, the pairing score represents the number of overlapping audience members identified in the example number of overlapping audience members identifier column 715 relative to the number of unique audience members identified in the example smallest number of unique audience members identifier column 720. However, any other approach for calculating a pairing score may additionally or alternatively be used.

The example threshold applied identifier column 730 identifies the relationship threshold value used in determining whether the media identified in the media identifier columns 705, 710 are related. The example media related identifier column 725 identifies the relationship status for the media identified in the media identifier columns 705, 710 based on the pairing score identified in the pairing score identifier column 725 and the threshold applied identifier column 730.

In the illustrated example of FIG. 7, the example classified media-pairings data table 700 includes three example rows 750, 760, 770. The first example row 750 indicates a media-pairing including the Aug. 7, 2015, broadcast of "Talk Show" and the Aug. 11, 2015, broadcast of "Golf Tournament." The example first row 750 indicates that "7%" of the audience of the "Talk Show" broadcast ("9,541" users) were also audience members of the "Golf Tournament," which was broadcast four days after the "Talk Show." In the illustrated example, because the pairing score ("7%") fails to satisfy the relationship threshold ("70%"), the media indicated in the first example row 750 are not classified as related media.

The second example row 760 indicates a media-pairing including the Aug. 7, 2015, broadcast of "Talk Show" and the Aug. 15, 2015, broadcast of "Family Court." The example second row 760 indicates that "27%" of the audience of the "Family Court" broadcast ("570" users) were also audience members of the "Talk Show," which was broadcast eight days before the "Family Court." In the illustrated example, because the pairing score ("27%") fails to satisfy the relationship threshold ("80%"), the media indicated in the second example row 760 are not classified as related media.

The third example row 770 indicates a media-pairing including the Aug. 11, 2015, broadcast of "Golf Tournament" and the Aug. 15, 2015, broadcast of "Family Court." The example third row 770 indicates that "71%" of the audience of the "Family Court" broadcast ("570" users) were also audience members of the "Golf Tournament," which was broadcast four days before the "Family Court." In the illustrated example, because the pairing score ("71%") satisfies the relationship threshold ("70%"), the media indicated in the third example row 770 are classified as related media.

While an example manner of implementing the social media server 105 FIG. 1 is illustrated in FIG. 2, and an example manner of implementing the central facility 110 of FIG. 1 is illustrated in FIG. 2, one or more of the elements, processes and/or devices illustrated in FIG. 2 may be combined, divided, re-arranged, omitted, eliminated and/or implemented in any other way. Further, the example social message interface 205, the example social message database 210, the example social message exposure database 215, the example messages identifier 220, the example query handler 225 and/or, more generally, the example social media server 105 of FIG. 1, and/or the example media profile database 250, the example query engine 255, the example message logger 260, the example media messages database 265, the example audience estimator 270, the example audience database 275, the example pairing classifier 280, the example media-pairings database 285, the example reporter 290 and/or, more generally, the example central facility 110 of FIG. 1 may be implemented by hardware, software, firmware and/or any combination of hardware, software and/or firmware. Thus, for example, any of the example social message interface 205, the example social message database 210, the example social message exposure database 215, the example messages identifier 220, the example query handler 225 and/or, more generally, the example social media server 105 of FIG. 1, and/or the example media profile database 250, the example query engine 255, the example message logger 260, the example media messages database 265, the example audience estimator 270, the example audience database 275, the example pairing classifier 280, the example media-pairings database 285, the example reporter 290 and/or, more generally, the example central facility 110 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example social message interface 205, the example social message database 210, the example social message exposure database 215, the example messages identifier 220, the example query handler 225 and/or, more generally, the example social media server 105 of FIG. 1, and/or the example media profile database 250, the example query engine 255, the example message logger 260, the example media messages database 265, the example audience estimator 270, the example audience database 275, the example pairing classifier 280, the example media-pairings database 285, the example reporter 290 and/or, more generally, the example central facility 110 of FIG. 1 is/are hereby expressly defined to include a tangible computer readable storage device or storage disk such as a memory, a digital versatile disk (DVD), a compact disk (CD), a Blu-ray disk, etc. storing the software and/or firmware. Further still, the example social media server 105 of FIG. 1 and/or the example central facility 110 of FIG. 1 may include one or more elements, processes and/or devices in addition to, or instead of, those illustrated in FIG. 2, and/or may include more than one of any or all of the illustrated elements, processes and devices.

Figure 8:
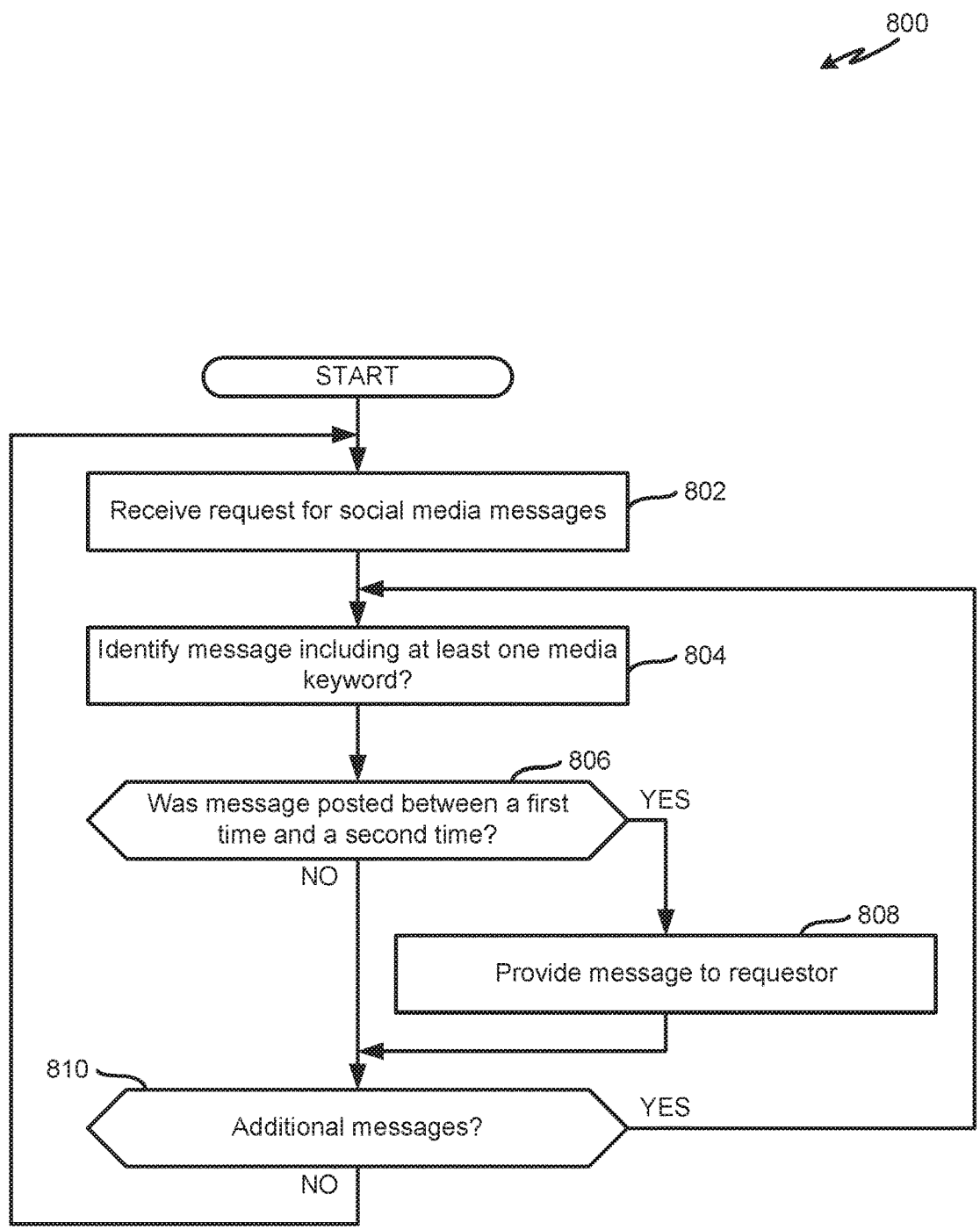
FIG. 8 is a flowchart representative of example machine-readable instructions that may be executed by the example social media server of FIGS. 1 and/or 2 to reply to a request for social media messages associated with media of interest.

Flowcharts representative of example machine readable instructions for implementing the example social media server 105 of FIGS. 1 and/or 2 is/are shown in FIGS. 8 and/or 9. In these examples, the machine readable instructions comprise a program(s) for execution by a processor such as the processor 1412 shown in the example processor platform 1400 discussed below in connection with FIG. 14. The program(s) may be embodied in software stored on a tangible computer readable storage medium such as a CD-ROM, a floppy disk, a hard drive, a digital versatile disk (DVD), a Blu-ray disk, or a memory associated with the processor 1412, but the entire program(s) and/or parts thereof could alternatively be executed by a device other than the processor 1412 and/or embodied in firmware or dedicated hardware. Further, although the example program (s) is/are described with reference to the flowcharts illustrated in FIGS. 10-12 and/or 13, many other methods of implementing the example central facility 110 may alternatively be used. For example, the order of execution of the blocks may be changed, and/or some of the blocks described may be changed, eliminated, or combined.

FIG. 8 is a flowchart representative of example machine-readable instructions 800 that may be executed by the example social media server 105 of FIGS. 1 and/or 2 to reply to a request for social media messages of interest. The example instructions 800 of the illustrated example of FIG. 8 begin at block 802 when the example query handler 225 of the example social media server 105 of FIG. 2 receives a request for social media message information from the query engine 255 of the example central facility 110 of FIG. 2. In the illustrated example, the example query includes a request that all social media messages, where the social media message includes one or more media keyword(s) and was posted by a user between a first time and a second time, be presented to the query engine 255. However, any other approach to querying the social media server 105 may additionally or alternatively be used.

In the illustrated example, the query is received via the network 130. However, the query may be received in any other fashion. Moreover, the example query of the illustrated example is received as the results are being requested. That is, the example query engine 255 expects an immediate response to the query. However, the query may be received ahead of time, and the example query handler 225 may await an appropriate time to respond to the query.

At block 804, the example messages identifier 220 of FIG. 2 identifies a message of interest. In the illustrated example, the example messages identifier 220 inspects the example social message database 210 to determine whether the message is responsive to the query. For example, the messages identifier 220 identifies whether a social media message includes at least one media keyword. In the illustrated example, the media keywords are text strings that are associated with particular media of interest. An example data table 400 including example media identifiers and their associated media keywords is shown in the illustrated example of FIG. 4. In the illustrated example, the messages identifier 220 uses regular expressions to determine whether the social media message includes the at least one media keyword. However, any other approach to identifying whether keywords are present in a social media message may additionally or alternatively be used.

At block 806, the example messages identifier 220 determines whether the identified message was posted between a first time and a second time. In the illustrated example, the first time and the second time represent a media presentation time range during which corresponding media is broadcast. An example data table 400 including example media identifiers and their associated media presentation time ranges is shown in the illustrated example of FIG. 4. In the illustrated example, the messages identifier 220 inspects the example social message database 210 to determine whether the message is responsive to the query. For example, the messages identifier 220 identifies whether the message was posted during the media presentation time range.

If, at block 806, the messages identifier 220 determines that the identified message was not presented between the first time and the second time, then, at block 810, the messages identifier 220 determines whether additional messages having at least one media keyword exists. If, at block 810, such messages exist, then, at block 804, the messages identifier 220 identifies those messages and, at block 806, the messages identifier 220 determines whether those messages were posted between a first time and a second time.

If, at block 806, the identified social media message was posted between the first time and the second time, then, at block 808, the example query handler 225 provides the social media message to the query engine 255. After the example query handler 225 provides the social media message at block 808 or if the messages identifier 220 determines that the identified social media message was not posted between the first time and the second time at block 806, then, at block 810, the example messages identifier 220 determines whether additional messages having at least one media keyword exist. If, at block 810, the example messages identifier 220 determines additional social media messages having at least one media keyword do not exist, control returns to block 802 and the example query handler 225 awaits further requests for social media messages.

While in the illustrated example, the example instructions 800 of FIG. 8 represent a single iteration of providing requested social media messages of interest, in practice, the example instructions 800 of the illustrated example of FIG. 8 may be executed in parallel (e.g., in separate threads) to allow the social media server 105 to handle multiple requests for social media messages of interests at a time.

Figure 9:
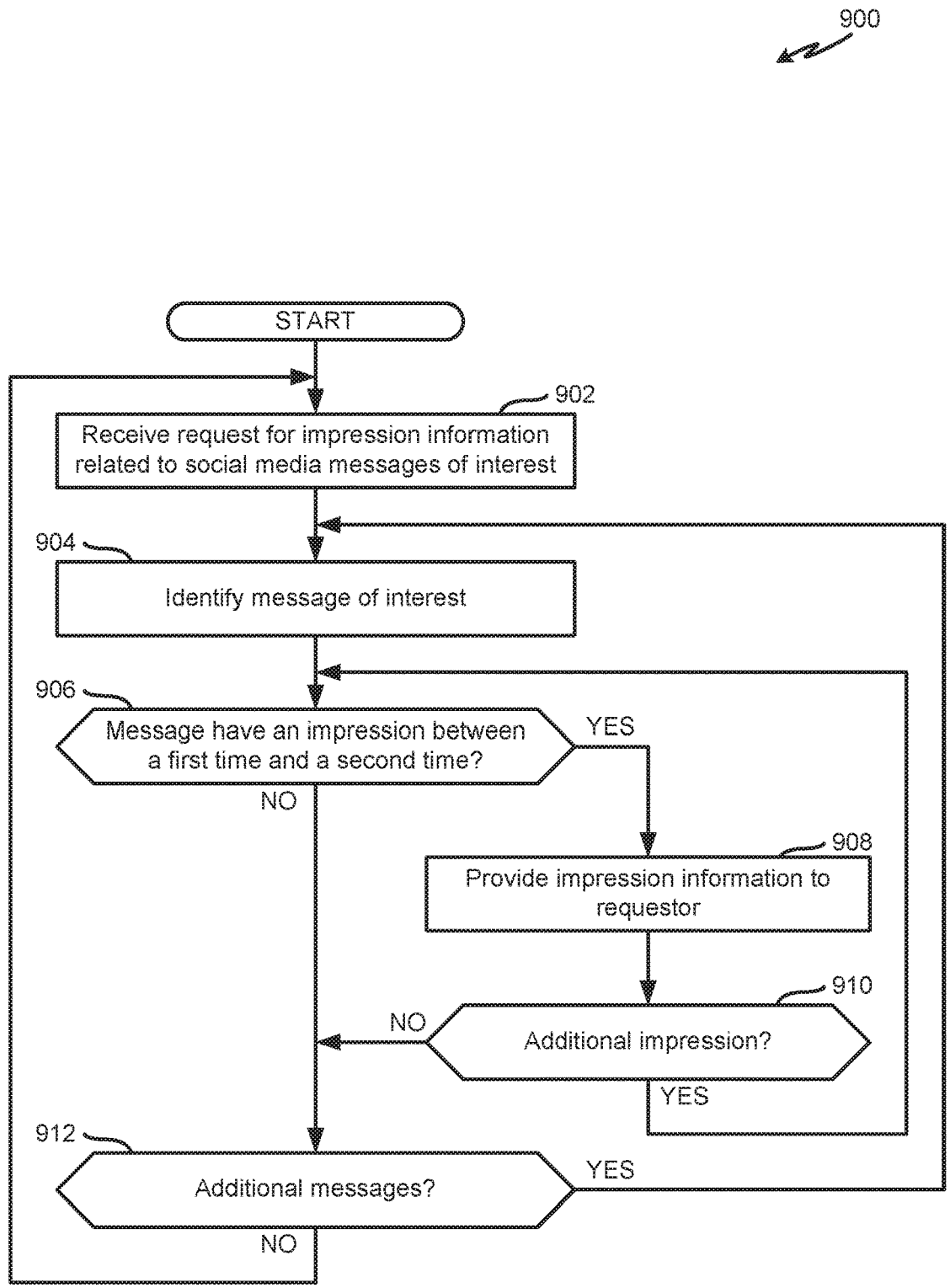
FIG. 9 is a flowchart representative of example machine-readable instructions that may be executed by the example social media server of FIGS. 1 and/or 2 to reply to a request for impression information related to social media messages of interest.

FIG. 9 is a flowchart representative of example machine-readable instructions 900 that may be executed by the example social media server 105 of FIGS. 1 and/or 2 to reply to a request for impression information related to social media messages of interest. For example, social media server 105 may receive a request to provide usernames of users who were presented media-exposure social media messages of interest during broadcast of the corresponding media. The example instructions 900 of the illustrated example of FIG. 9 begin at block 902 when the example query handler 225 of the example social media server 105 of FIG. 2 receives a request for impression information related to social media messages of interest from the query engine 255 of the example central facility 110 of FIG. 2. In the illustrated example, the example query includes a message identifier used to identify a social media message of interest. However, any other approach to querying the social media server 105 may additionally or alternatively be used.

In the illustrated example, the query is received via the network 130. However, the query may be received in any other fashion. Moreover, the example query of the illustrated example is received as the results are being requested. That is, the example query engine 255 expects an immediate response to the query. However, the query may be received ahead of time, and the example query handler 225 may await an appropriate time to respond to the query.

At block 904, the example messages identifier 220 of FIG. 2 identifies a message of interest. In the illustrated example, the example messages identifier 220 inspects the example social message exposure database 215 to determine whether the message is responsive to the query. For example, the messages identifier 220 identifies whether the social media message has at least one impression between a first time and a second time. In the illustrated example, the first time and the second time represent a media presentation time range during which corresponding media is broadcast. An example data table 400 including example media identifiers and their associated media presentation time ranges is shown in the illustrated example of FIG. 4.

If, at block 906, the example messages identifier 220 determined that the social media message of interest did not have an impression during the media presentation time range of the media of interest, then, at block 912, the messages identifier 220 determines whether additional social media messages of interest exists. If, at block 912, such messages exist, then, at block 904, the messages identifier 220 identifies those messages and, at block 906, the messages identifier 220 determines whether those messages of interest have an impression between a first time and a second time.

If, at block 906, the identified social media message had an impression between the first time and the second time, then, at block 908, the example query handler 225 provides the message information to the query engine 255. For example, the query handler 225 may return the username of the user who was presented the social media message of interest, a timestamp indicating when the user was presented the social media message of interest, demographic information (e.g., age, gender, occupation, etc.) associated with the user. After the example query handler 225 provides the social media message at block 908, then, at block 910, the example messages identifier 220 determines whether there is another impression associated with the social media message of interest to process. If, at block 910, the messages identifier 220 determined that there is another impression to process, then control returns to block 906 to determine whether the impression was between the first time and the second time.

If, at block 906, the messages identifier 220 determined that the impression was not between the first time and the second time, or, if, at block 910, the messages identifier 220 determined that the social media message of interest did not have another impression to process, then, control proceeds to block 912 to determine whether there is another social media message of interest to process. If, at block 912, the example messages identifier 220 determined additional social media messages of interest do not exist, control returns to block 902 and the example query handler 225 awaits further requests for impression information related to social media messages of interest.

While in the illustrated example, the example instructions 900 of FIG. 9 represent a single iteration of providing requested social media messages of interest, in practice, the example instructions 900 of the illustrated example of FIG. 9 may be executed in parallel (e.g., in separate threads) to allow the social media server 105 to handle multiple requests for social media messages of interests at a time.

Figure 10:
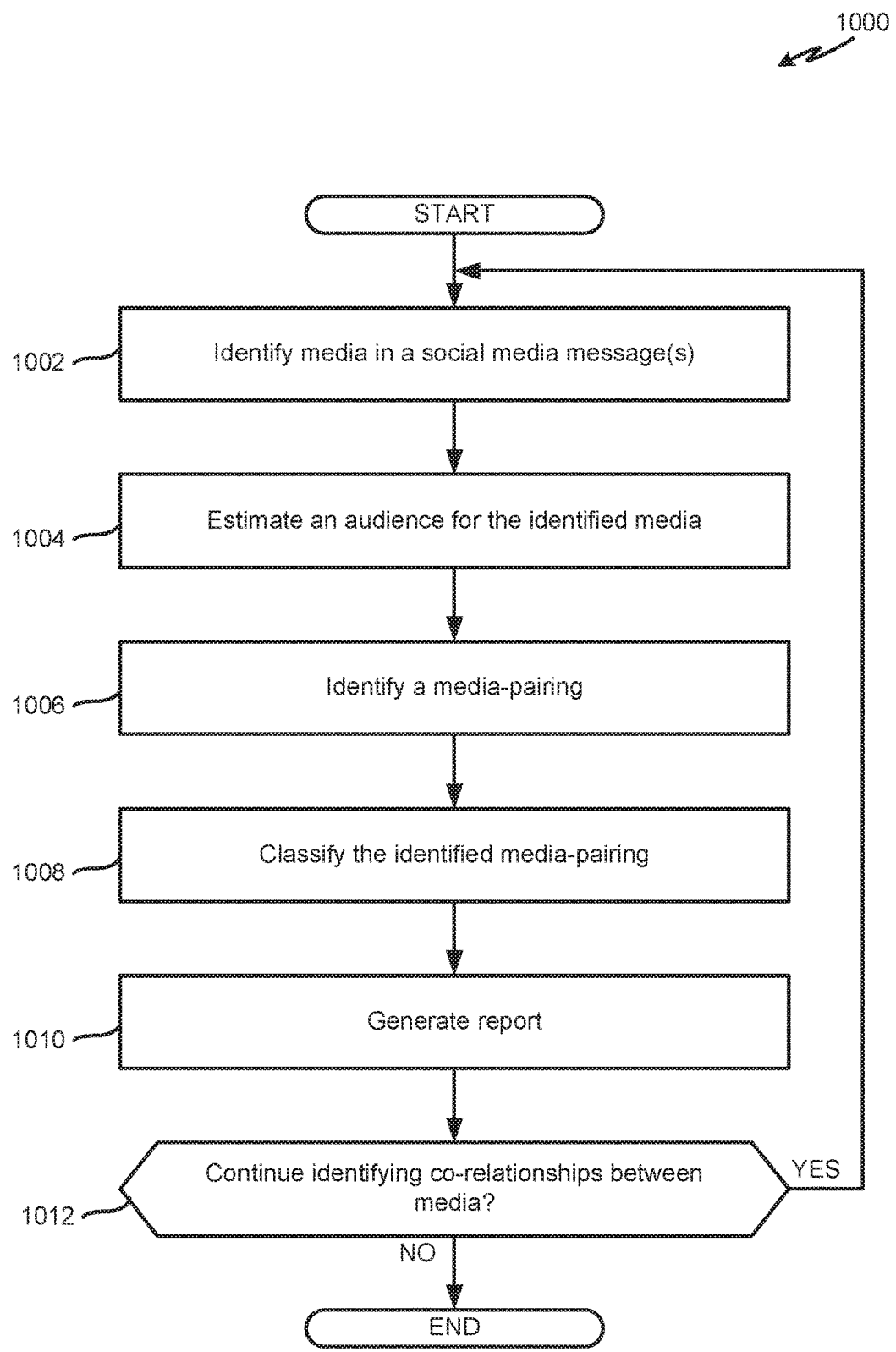
FIG. 10 is a flowchart representative of example machine-readable instructions that may be executed by the example central facility of FIGS. 1 and/or 2 to identify co-relationships between media using social media.
Figure 11:
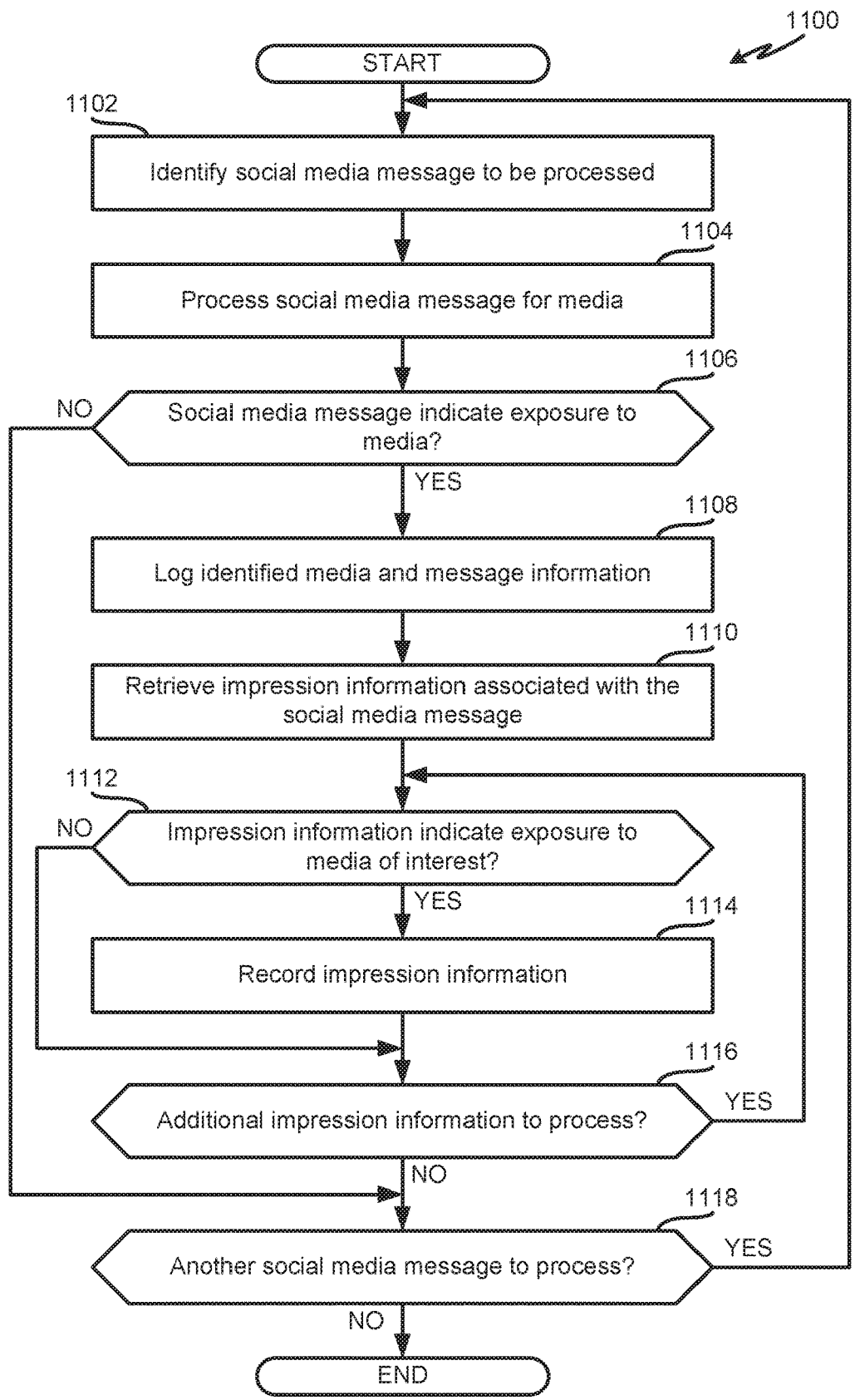
FIG. 11 is a flowchart representative of example machine-readable instructions that may be executed by the example central facility of FIGS. 1 and/or 2 to identify media-exposure social media messages of interest.
Figure 12:
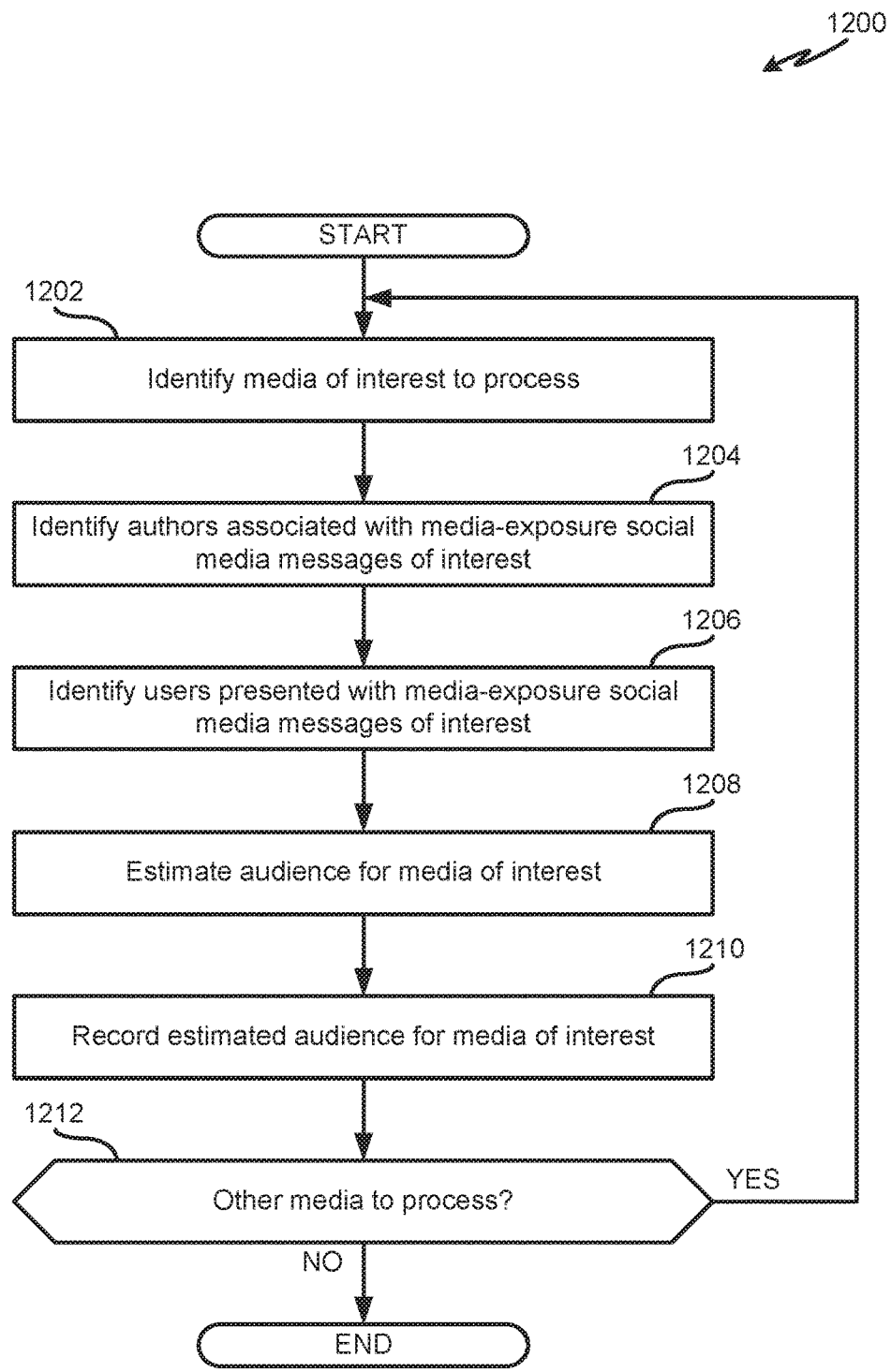
FIG. 12 is a flowchart representative of example machine-readable instructions that may be executed by the example central facility of FIGS. 1 and/or 2 to estimate audiences for media based on media-exposure social media messages of interest.

Flowcharts representative of example machine readable instructions for implementing the example central facility 110 of FIGS. 1 and/or 2 is/are shown in FIGS. 10-12 and/or 13. In these examples, the machine readable instructions comprise a program(s) for execution by a processor such as the processor 1512 shown in the example processor platform 1500 discussed below in connection with FIG. 15. The program(s) may be embodied in software stored on a tangible computer readable storage medium such as a CD-ROM, a floppy disk, a hard drive, a digital versatile disk (DVD), a Blu-ray disk, or a memory associated with the processor 1512, but the entire program(s) and/or parts thereof could alternatively be executed by a device other than the processor 1512 and/or embodied in firmware or dedicated hardware. Further, although the example program(s) is/are described with reference to the flowcharts illustrated in FIGS. 10-12 and/or 13, many other methods of implementing the example central facility 110 may alternatively be used. For example, the order of execution of the blocks may be changed, and/or some of the blocks described may be changed, eliminated, or combined.

As mentioned above, the example processes of FIGS. 8 and/or 9 and/or the FIGS. 10-12 and/or 13 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 8 and/or 9 and/or the FIGS. 10-12 and/or 13 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 10 is a flowchart representative of example machine-readable instructions 1000 that may be executed by the example central facility 110 of FIGS. 1 and/or 2 to identify co-relationships between media using social media. The example process 1000 of the illustrated example of FIG. 10 begins at block 1002 when the example central facility 110 identifies media in a social media message. For example, the message logger 260 (FIG. 2) may parse a social media message for reference to media based on a media keyword. In some examples, the central facility requests from the social media server 105 social media messages related to media of interest. For example, the query engine 255 (FIG. 2) may consult the example data table 400 of the illustrated example of FIG. 4 to identify media keywords that are used to associate social media messages with particular media. Example responses to the request may be formatted in a manner described in connection with the example data table 500 of FIG. 5. An example approach to identifying social media messages of interest is described below in connection with FIG. 11.

At block 1004, the example central facility 110 estimates an audience associated with the identified media. For example, the audience estimator 270 (FIG. 2) may analyze additional social media messages associated with the media and identify unique audience members of the media. In the illustrated example, the audience estimator 270 identifies unique audience members based on identified authors of media-exposure social media messages of interest. Additionally or alternatively, the audience estimator 270 may identify unique audience members based on identified users of social media who were presented the media-exposure social media messages of interest. Example estimates for audiences of media may be stored in a manner described in connection with the example data table 6 of FIG. 6. An example approach to estimating media audiences is described below in connection with FIG. 12.

At block 1006, the example central facility 110 identifies a media-pairing for processing. For example, the pairing classifier 280 (FIG. 2) may parse the media audience estimates and select two media for processing. In some examples, the pairing classifier 280 may exclude media from media-pairings when the media fails to satisfy a size threshold. For example, when the size of the estimated audience for a particular media is less than a size threshold (e.g., 200 audience members), the pairing classifier 280 may not include the media in a media-pairing for classification. In some examples, the pairing classifier 280 may identify a media-pairing by identifying media that satisfy constraints for a media campaign.

At block 1008, the example central facility 110 classifies the media-pairing based on occurrences of audience members in the audiences of the respective media. For example, the pairing classifier 280 may calculate a pairing score based on identified audience members included in a listing of audience members associated with first media of the media-pairing and a listing of audience members associated with second media of the media-pairing. In the illustrated example, the pairing classifier 280 classifies the first media and the second media as related or unrelated based on a comparison of the pairing score to a relationship threshold. An example approach to classifying the identified media-pairing is described below in connection with FIG. 13.

At block 1010, the example central facility 110 generates a report. For example, the reporter 290 (FIG. 2) may generate a report identifying media-pairings in which the media were classified as related media or classified as unrelated media. In some examples, the reporter 290 may select the media-pairings to include in the report based on the entity requesting the report. For example, the reporter 290 may identify media-pairings including related media that are beneficial to a proprietor of golf equipment. In some examples, the reporter 290 may include a variety of uses bases based on the related media-pairings.

At block 1012, the example central facility 110 determines whether to continue identifying co-relationships between media using social media. If, at block 1012, the central facility 110 determined to continue identifying co-relationships between media using social media, then control returns to block 1002 to identify media in a social media message(s). If, at block 1010, the central facility 110 determined not to continue identifying co-relationships between media using social media, the example process 1000 of FIG. 10 ends.

FIG. 11 is a flowchart representative of example machine-readable instructions 1100 that may be executed by the example central facility 110 of FIGS. 1 and/or 2 to record message information related to media-exposure social media messages of interest. The example process 1100 of the illustrated example of FIG. 11 begins at block 1102 when the example message logger 260 of the central facility 110 identifies a social media message to be processed. For example, the message logger 260 may receive the social media message from the example query handler 225 of the example social media server 105 of FIG. 2. At block 1104, the example message logger 260 processes the social media message for media. In the illustrated example, the message logger 260 utilizes natural language processing techniques to determine whether the text of the message indicates exposure to the corresponding media.

At block 1106, the message logger 260 determines whether the social media message is a media-exposure social media message. If, at block 1106, the message logger 260 did not identify exposure to media of interest in the social media message, then the social media message is not a media-exposure social media message and control proceeds to block 1116 to determine whether another social media message to process exists.

If, at block 1106, the example message logger 260 determined that the social media message is a media-exposure social media message, then, at block 1108, the example message logger 260 logs the identified media in the example media messages database 265 of the central facility 110 of FIG. 2, along with a message identifier for the social media message and the posting user (e.g., the message author).

At block 1110, the example message logger 260 retrieves impression information associated with the social media message. For example, the message logger 260 may request the social media server 105 provide all impression information associated with users presented the social media message. At block 1112, the example message logger 260 determines whether the impression information indicates exposure to media of interest. For example, the message logger 260 may compare a timestamp of the impression with a media time range associated with the media of interest. If, at block 1112, the message logger 260 determined that the impression information indicates exposure to media of interest, then, at block 1114, the message logger 260 records the impression information. For example, the message logger 260 may log the username associated with the impression.

If, at block 1112, the message logger 260 determined that the impression information did not indicate exposure to media of interest, of, after the message logger 260 records the impression information at block 1114, then, at block 1116, the message logger 260 determines whether there is another impression to process. If, at block 1116, the message logger 260 determined that there is additional impression information to process, then control returns to block 1112 to determine whether the impression information indicates exposure to media of interest.

If, at block 1116, the message logger 260 determined that there is not additional impression information to process, of, if at block 1106, the message logger 260 determined that the social media message did not reference exposure to media, then, at block 1118, the message logger 260 determines whether another social media message to process exists. If, at block 1118, the example message logger 260 determined another social media message to process exists, then control returns to block 1102 and the message logger 260 awaits further social media messages to process. Otherwise, the example process 1100 of FIG. 11 ends.

FIG. 12 is a flowchart representative of example machine-readable instructions 1200 that may be executed by the example central facility 110 of FIGS. 1 and/or 2 to estimate audiences for media of interest. The example process 1200 of the illustrated example of FIG. 12 begins at block 1202 when the example audience estimator 270 of the central facility 110 identifies media to be processed. For example, the audience estimator 270 may parse the media messages database 265 of the central facility 110 for media to process. At block 1204, the example audience estimator 270 identifies authors associated with social media messages of interest. For example, the audience estimator 270 may parse the media messages database 265 to identify media-exposure social media messages that reference the identified media. At block 1206, the example audience estimator 270 identifies users who were presented with the social media messages of interest. For example, the audience estimator 270 may parse the media messages database 265 to identify impression information associated with the media-exposure social media messages that reference the identified media.

At block 1208, the example audience estimator 270 estimates an audience for the identified media. For example, the audience estimator 270 may remove duplicate usernames from the identified audience members. At block 1210, the example audience estimator 270 records the estimated audience for the media of interest. For example, the audience estimator 270 may log the media identifier, the number of messages referencing the identified media and the number of unique audience members in the example audience database 275 of the central facility 110.

At block 1212, the example audience estimator 270 determines whether other media to process exists. If, at block 1212, the example audience estimator 270 determined other media to process exists, then control returns to block 1202 and the audience estimator 270 awaits further media to process. Otherwise, the example process 1200 of FIG. 12 ends.

Figure 13:
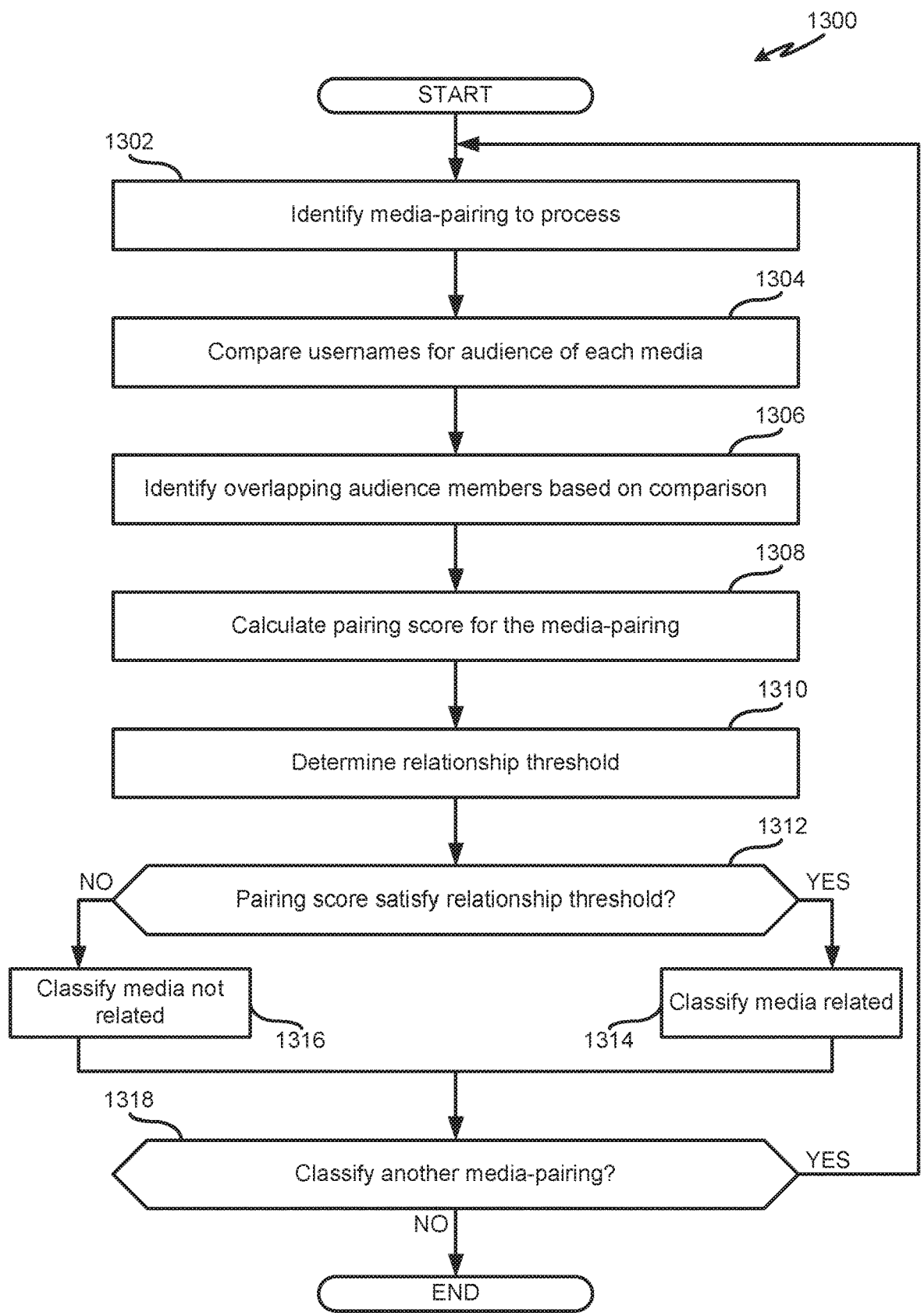
FIG. 13 is a flowchart representative of example machine-readable instructions that may be executed by the example central facility of FIGS. 1 and/or 2 to classify identified media-pairings.

FIG. 13 is a flowchart representative of example machine-readable instructions 1300 that may be executed by the example central facility 110 of FIGS. 1 and/or 2 to classify identified media-pairings. The example process 1300 of the illustrated example of FIG. 13 begins at block 1302 when the example pairing classifier 280 of the example central facility 110 of FIG. 2 identifies a media-pairing to process. For example, the pairing classifier 280 may parse the audience database 275 of the central facility 110 and select first and second media to process. In some examples, the pairing classifier 280 may perform a size check to confirm that the number of audience members for the first media and the second media satisfy a size threshold (e.g., is a minimum size).

At block 1304, the example pairing classifier 280 compares the usernames of the audience members included in the audience of the first media and the second media. At block 1306, the example pairing classifier 280 identifies overlapping audience members based on the comparison. For example, the pairing classifier 280 may identify the usernames included in the audience of the first media and the audience of the second media.

At block 1308, the example pairing classifier 280 calculates a pairing score for the media-pairing. In the illustrated example, the pairing classifier 280 calculates the pairing score based on the number of overlapping audience members and the number of social media messages identified for the respective media. In the illustrated example, the example pairing classifier 280 selects the lesser of the two social media message counts in calculating the pairing score for the media-pairing.

At block 1310, the example pairing classifier 280 determines a relationship threshold to use to classify the media-pairing. For example, the pairing classifier 280 may determine whether one or both media in the media-pairing includes a guest appearance by a positive influence guest and/or a negative influence guest, whether one or both media is a one-time event, whether a cross-over between the media is known, etc.

At block 1312, the example pairing classifier 280 determines whether the pairing score satisfies the relationship threshold. If, at block 1312, the example pairing classifier 280 determined that the pairing score satisfies the relationship threshold (e.g., meets and/or exceeds a minimum intersection percentage), then, at block 1314, the example pairing classifier 280 classifies the media-pairing as related media. If, at block 1312, the example pairing classifier 280 determined that the relationship threshold is not satisfied, then, at block 1316, the pairing classifier 280 classifies the media-pairing as not related media. In the illustrated example, the pairing classifier 280 stores the media-pairing classification in the example media-pairings database 285 of the central facility 110.

After the example pairing classifier 280 classifies the media-pairing as related media at block 1314, or after the pairing classifier 280 classifies the media-pairing as not related media at block 1316, then, at block 1318, the pairing classifier 280 determines whether another media-pairing for processing exists. If, at block 1318, the pairing classifier 280 determined that another media-pairing for processing exists, then control returns to block 1302 and the example pairing classifier 280 awaits another media-pairing to identify. Otherwise, if, at block 1318, the pairing classifier 280 determined that another media-pairing to classify does not exist, the example process 1300 of FIG. 13 ends.

Figure 14:
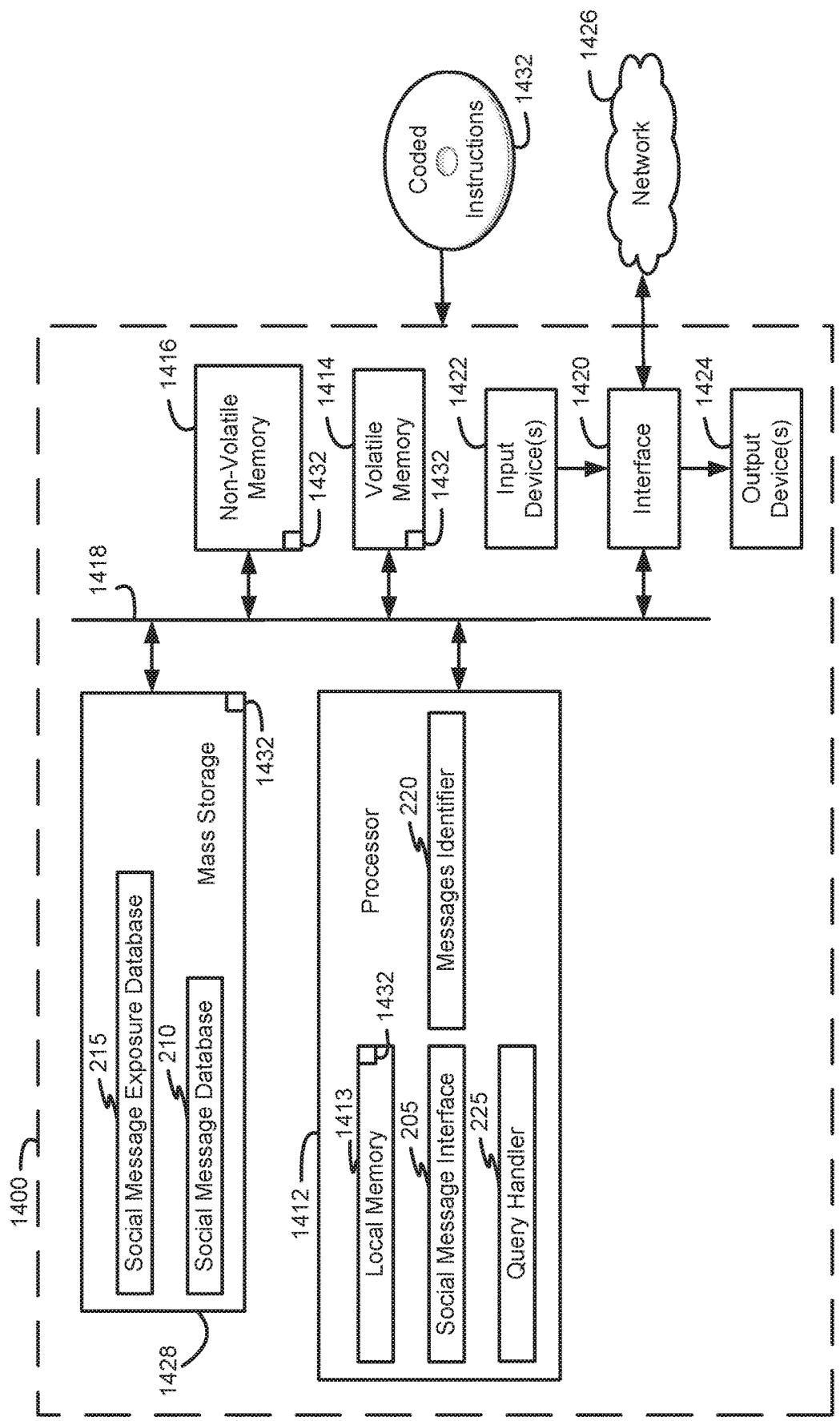
FIG. 14 is a block diagram of an example processing platform capable of executing the example machine-readable instructions of FIGS. 8 and/or 9 to implement the example social media server of FIGS. 1 and/or 2.

FIG. 14 is a block diagram of an example processor platform 1400 capable of executing the instructions of FIGS. 8 and/or 9 to implement the social media server 105 of FIGS. 1 and/or 2. The processor platform 1400 can be, for example, a server, a personal computer, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer.

The processor 1412 of the illustrated example includes a local memory 1413 (e.g., a cache). The processor 1412 of the illustrated example executes the instructions to implement the example social message interface 205, the example messages identifier 220 and the example query handler 225. The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a PCI express interface.

In the illustrated example, one or more input devices 1422 are connected to the interface circuit 1420. The input device(s) 1422 permit(s) a user to enter data and commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and digital versatile disk (DVD) drives. The example mass storage 1428 implements the example social message database 210 and the example social message exposure database 215.

The coded instructions 1432 of FIGS. 8 and/or 9 may be stored in the mass storage device 1428, in the volatile memory 1414, in the non-volatile memory 1416, and/or on a removable tangible computer readable storage medium such as a CD or DVD.

Figure 15:
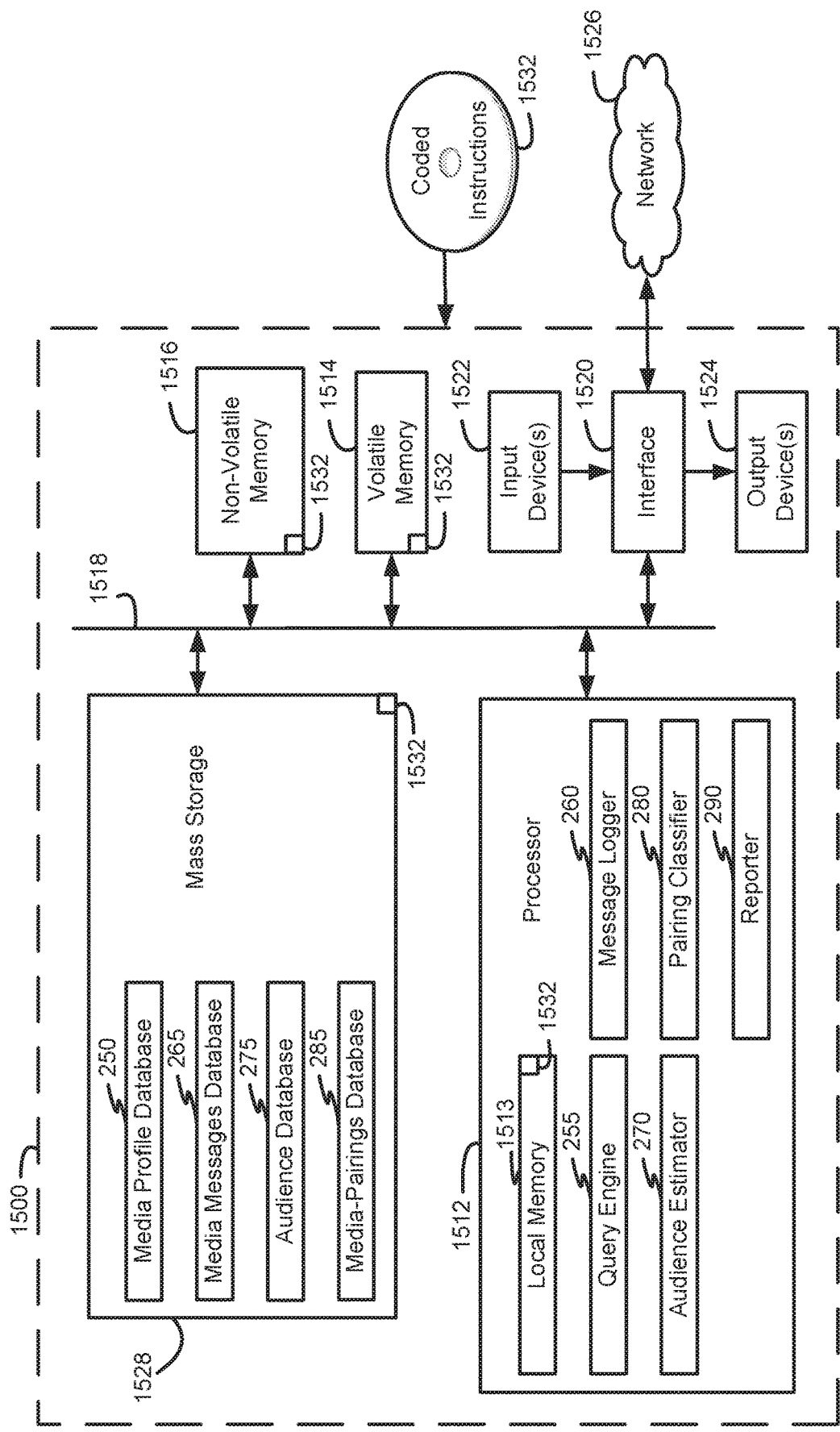
FIG. 15 is a block diagram of an example processing platform capable of executing the example machine-readable instructions of FIGS. 10-12 and/or 13 to implement the example central facility of FIGS. 1 and/or 2.

FIG. 15 is a block diagram of an example processor platform 1500 capable of executing the instructions of FIGS. 10-12 and/or 13 to implement the central facility 110 of FIGS. 1 and/or 2. The processor platform 1500 can be, for example, a server, a personal computer, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors or controllers from any desired family or manufacturer.

The processor 1512 of the illustrated example includes a local memory 1513 (e.g., a cache). The processor 1512 of the illustrated example executes the instructions to implement the example query engine 255, the example message logger 260, the example audience estimator 270, the example pairing classifier 280 and the example reporter 290. The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, one or more input devices 1522 are connected to the interface circuit 1520. The input device(s) 1522 permit(s) a user to enter data and commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1520 of the illustrated example, thus, typically includes a graphics driver card, a graphics driver chip or a graphics driver processor.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL), a telephone line, coaxial cable, a cellular telephone system, etc.).

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, RAID systems, and digital versatile disk (DVD) drives. The example mass storage 1528 implements the example media profile database 250, the example media messages database 265, the example audience database 275 and the example media-pairings database 285.

The coded instructions 1532 of FIGS. 10-12 and/or 13 may be stored in the mass storage device 1528, in the volatile memory 1514, in the non-volatile memory 1516, and/or on a removable tangible computer readable storage medium such as a CD or DVD.

From the foregoing, it will appreciate that the above disclosed methods, apparatus and articles of manufacture identify co-relationships between media using social media. For example, examples disclosed herein identify relationships between television programs by identifying instances where a consumer posts social media messages about two different television programs. In some disclosed examples, a total percentage of intersection between authors of social media messages about the respective television programs is calculated. For example, a consumer may post a social media message about a televised airing of a golf tournament and then four days later post a social media message about an episode of a court-related program. In some disclosed examples, the relationship identified by the social media messages is used to adjust (e.g., optimize) advertising strategies such that similar advertisements are shown during airings of the related television programs.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
an audience estimator to:
estimate a first audience of first media based on a first set of media-exposure social media messages corresponding to client devices referencing the first media; and estimate a second audience of second media based on a second set of media-exposure social media messages corresponding to the client devices referencing the second media; and a pairing classifier to:

determine a pairing-score for a media-pairing based on the first and second audiences and the first and second sets of media-exposure social media messages;

determine a relationship threshold to apply to the media-pairing based on the first media and the second media; and classify the media-pairing based on the pairing-score and the relationship threshold to improve an accuracy of a system associated with generating audience analysis information, the audience estimator and the paring classifier implemented by one or more logic circuits.

2. The apparatus as defined in claim 1, further including a message logger to:

obtain the media-exposure social media messages corresponding to the client devices by querying a social media server based on media keywords and media posting timestamps; and identify the media-pairing including the first media and the second media.

3. The apparatus as defined in claim 1, wherein the audience estimator is to estimate the first audience by:

associating each of the media-exposure social media messages included in the first set with an author username; and recording a first occurrence of each of the identified author usernames.

4. The apparatus as defined in claim 1, wherein the audience estimator is to estimate the first audience by:

identifying an impression associated with each of the media-exposure social media messages included in the first set;

identifying a user identifier associated with the impression; and recording a first occurrence of each of the identified impression user identifiers.

5. The apparatus as defined in claim 1, wherein the audience estimator is to estimate the first audience by:

identifying a first subset of usernames associated with posting the first set of media-exposure social media messages to the social media server;

identifying a second subset of usernames associated with impressions of the media-exposure social media messages included in the first set, each of the usernames included in the second subset of usernames not present in the first subset of usernames.

6. The apparatus as defined in claim 1, wherein the pairing classifier is to determine the pairing-score for the media-pairing by:

identifying a subset of audience members included in the first audience and the second audience; and determining a size of the subset of audience members and a first count of media-exposure social media messages included in the first set.

7. The apparatus as defined in claim 1, wherein the pairing classifier is to classify the media-pairing by:

applying the relationship threshold to the pairing-score; and classifying the first media related to the second media when the pairing-score satisfies the relationship threshold.

8. A non-transitory computer readable medium comprising instructions that, when executed, cause a machine to at least:

estimate a first audience of first media based on a first set of media-exposure social media messages corresponding to client devices referencing the first media;

estimate a second audience of second media based on a second set of media-exposure social media messages corresponding to the client devices referencing the second media;

determine a pairing-score for a media-pairing based on the first and second audiences and the first and second sets of media-exposure social media messages;

determine a relationship threshold to apply to the media-pairing based on the first media and the second media; and classify the media-pairing based on the pairing-score and the relationship threshold to improve an accuracy of a system associated with generating audience analysis information.

9. The non-transitory computer readable medium as defined in claim 8, wherein the instructions are to further cause the machine to:

obtain the media-exposure social media messages corresponding to the client devices by querying a social media server based on media keywords and media posting timestamps; and identify the media-pairing including the first media and the second media.

10. The non-transitory computer readable medium as defined in claim 8, wherein the instructions are to further cause the machine to:

associate each of the media-exposure social media messages included in the first set with an author username; and estimating the first audience by recording a first occurrence of each of the identified author usernames.

11. The non-transitory computer readable medium as defined in claim 8, wherein the instructions are to further cause the machine to:

identify an impression associated with each of the media-exposure social media messages included in the first set;

identify a user identifier associated with the impression; and estimate the first audience by recording a first occurrence of each of the identified impression user identifiers.

12. The non-transitory computer readable medium as defined in claim 8, wherein the instructions are to further cause the machine to:

identify a first subset of usernames associated with posting the first set of media-exposure social media messages to the social media server; and estimate the first audience by identifying a second subset of usernames associated with impressions of the media-exposure social media messages included in the first set, each of the usernames included in the second subset of usernames not present in the first subset of usernames.

13. The non-transitory computer readable medium as defined in claim 8, wherein the instructions are to further cause the machine to:

identify a subset of audience members included in the first audience and the second audience; and determine the pairing-score for the media-pairing by determining a size of the subset of audience members and a first count of media-exposure social media messages included in the first set.

14. The non-transitory computer readable medium as defined in claim 8, wherein the instructions are to further cause the machine to:
   apply the relationship threshold to the pairing-score; and
   classify the first media related to the second media when the pairing-score satisfies the relationship threshold.

15. A method comprising:
   estimating, by executing an instruction with a processor, a first audience of first media based on a first set of media-exposure social media messages corresponding to client devices referencing the first media;
   estimating, by executing an instruction with the processor, a second audience of second media based on a second set of media-exposure social media messages corresponding to the client devices referencing the second media;
   determining, by executing an instruction with the processor, a pairing-score for a media-pairing based on the first and second audiences and the first and second sets of media-exposure social media messages;
   determining, by executing an instruction with the processor, a relationship threshold to apply to the media-pairing based on the first media and the second media; and
   classifying, by executing an instruction with the processor, the media-pairing based on the pairing-score and the relationship threshold to improve an accuracy of a system associated with generating audience analysis information.

16. The method as defined in claim 15, further including:
   obtaining the media-exposure social media messages corresponding to the client devices by querying a social media server based on media keywords and media posting timestamps; and
   identifying the media-pairing including the first media and the second media.

17. The method as defined in claim 15, wherein the estimating of the first audience includes:
   associating each of the media-exposure social media messages included in the first set with an author username; and
   recording a first occurrence of each of the identified author usernames.

18. The method as defined in claim 15, wherein the estimating of the first audience includes:
   identifying an impression associated with each of the media-exposure social media messages included in the first set;
   identifying a user identifier associated with the impression; and
   recording a first occurrence of each of the identified impression user identifiers.

19. The method as defined in claim 15, wherein the estimating of the first audience includes:
   identifying a first subset of usernames associated with posting the first set of media-exposure social media messages to the social media server;
   identifying a second subset of usernames associated with impressions of the media-exposure social media messages included in the first set, wherein each of the usernames included in the second subset of usernames is not present in the first subset of usernames.

20. The method as defined in claim 15, wherein the determining of the pairing-score for the media-pairing includes:
   identifying a subset of audience members included in the first audience and the second audience; and
   determining a size of the subset of audience members and a first count of media-exposure social media messages included in the first set.

* * * * *